United States Patent [19]
Wang

[11] Patent Number: 6,088,663
[45] Date of Patent: Jul. 11, 2000

[54] METHOD FOR COMBINING PHYSICAL OBJECTS USING POLAR COORDINATE STATISTICAL ANALYSIS

[75] Inventor: Rui-Feng Wang, Dexter, Mich.

[73] Assignee: The Regents of the University of Michigan, Ann Arbor, Mich.

[21] Appl. No.: 08/974,480

[22] Filed: Nov. 20, 1997

[51] Int. Cl.$^7$ .............................. G01B 11/26; G06F 17/18
[52] U.S. Cl. ........................ 702/179; 702/150; 702/152; 364/474.36; 356/375
[58] Field of Search .............................. 702/95, 179, 189, 702/150–152; 364/474.35, 474.36; 33/502, 503, 505; 358/518, 520; 356/373, 375

[56] References Cited

U.S. PATENT DOCUMENTS

| | | | |
|---|---|---|---|
| 3,799,676 | 3/1974 | Chatterton | 356/141.4 |
| 3,953,132 | 4/1976 | Michelsen | 356/141.1 |
| 4,134,681 | 1/1979 | Elmer | 702/150 |
| 4,623,977 | 11/1986 | Schrieber | 702/189 |
| 4,939,678 | 7/1990 | Beckwith, Jr. | 702/95 |
| 4,982,504 | 1/1991 | Söderberg et al. | 702/95 |
| 5,319,567 | 6/1994 | Ebenstein | 364/474.34 |
| 5,481,655 | 1/1996 | Jacobs | 358/523 |
| 5,596,428 | 1/1997 | Tytgat et al. | 358/518 |

*Primary Examiner*—Marc S. Hoff
*Assistant Examiner*—Bryan Bui
*Attorney, Agent, or Firm*—Harness, Dickey & Pierce, P.L.C.

[57] ABSTRACT

A method is provided for combining a first physical object and a second physical object. A first locating point is defined on a first physical object, and a first location of the first locating point is determined by taking at least two measurements with respect to a Cartesian coordinate system. Similarly, a second locating point is defined on a second physical object. After combining the first physical object with the second physical object, a second location of the second locating point is determined by taking at least two measurements. The Cartesian measurement data is transformed into vector data before mean values, including directional mean values, are generated by performing statistical analysis in a Polar coordinate system. The first location can then be analyzed with respect to the second location using these mean values. This method can be applied to numerous applications, including the assembly of two manufactured automotive parts, exact color match of paint, or assessing the fit between an implant abutment and the prosthesis framework.

20 Claims, 31 Drawing Sheets

| The Cartesian Coordinate System | | The Polar Coordinate System |
|---|---|---|
| $P_{mc}(x_{mc}, y_{mc})$ | $\neq^{**}$ | $P_{mp}(r_{mp}, \Theta_{mp})$ |
| $V_{mc}$ with $|V_{md}|$ and $\theta_{mc}$ | $\neq^{**}$ | $r_{mp}$ with $r_{mp}$ and $\Theta_{mp}$ |
| $|V_{mc}| = \sqrt{x_{mc}^2 + y_{mc}^2}$ | $\neq^{*}$ | $r_{mp} = \dfrac{r_1 + r_2}{2}$ |
| $\theta_{mc} = \tan^{-1}\left(\dfrac{y_{mc}}{x_{mc}}\right)$ | $\neq^{**}$ | $\Theta_{mp} = \dfrac{\Theta_1 + \Theta_2}{2}$ |
| $x_{mc} = \dfrac{x_1 + x_2}{2}$ | $\neq^{**}$ | $r_{mp} \cos\Theta_{mp}$ |
| $y_{mc} = \dfrac{y_1 + y_2}{2}$ | $\neq^{**}$ | $r_{mp} \sin\Theta_{mp}$ |

\* : Unless $P_0, P_1, P_2$ are colinear.

\*\* : Unless $P_0, P_1, P_2$ are colinear and $P_1, P_2$ are within the same quadrat.

▓ : The components presently used in the statistical analysis.

FIG. 5c

| Variable | Data Set | Descriptive Statistics |
|---|---|---|
| $x$ | $x_1 \cdots x_i$ | |
| $y$ | $y_1 \cdots y_i$ | |
| $\|v\|$ | $\sqrt{x_1^2 + y_1^2} \cdots \sqrt{x_i^2 + y_i^2}$ | $\|v\| = r$, but $\|\bar{v}\| \neq \bar{r}$ |
| $\theta$ | $\tan^{-1}\frac{y_1}{x_1} \cdots \tan^{-1}\frac{y_i}{x_i}$ | $\theta = \Theta$, but $\bar{q} \neq \bar{\Theta}$ |
| $r$ | $r_1 = \|v_1\| \cdots r_i = \|v_i\|$ | $\bar{r} = \frac{1}{i}\sum_{n=1}^{i} r_n = \frac{1}{i}\sum_{n=1}^{i} \sqrt{x_n^2 + y_n^2}$ |
| | | $S.D. = \sqrt{\dfrac{\sum_{n=1}^{i}(r_n - \bar{r})^2}{i-1}}$ |
| $\hat{x}$ | $\cos\theta_1 \cdots \cos\theta_i$ | $\bar{\hat{x}} = \frac{1}{i}\sum_{n=1}^{i} \cos\Theta_n$ |
| $\hat{y}$ | $\sin\theta_1 \cdots \sin\theta_i$ | $\bar{\hat{y}} = \frac{1}{i}\sum_{n=1}^{i} \sin\Theta_n$ |
| | here $e_r = \sqrt{\cos^2\Theta + \sin^2\Theta} = 1$, so $\bar{e}_r = \frac{1}{i}\sum_{n=1}^{i} e_m = 1$ | |
| $\Theta$ | $\tan^{-1}\frac{\hat{y}_1}{\hat{x}_1} \cdots \tan^{-1}\frac{\hat{y}_i}{\hat{x}_i}$ | $\bar{\Theta} = \tan^{-1}\dfrac{\bar{\hat{y}}}{\bar{\hat{x}}} = \tan^{-1}\dfrac{\frac{1}{i}\sum_{n=1}^{i}\sin\Theta_n}{\frac{1}{i}\sum_{n=1}^{i}\cos\Theta_n} = \dfrac{\sum_{n=1}^{i}\sin\Theta_n}{\sum_{n=1}^{i}\cos\Theta_n}$ |
| | | $C.S.D. = \sqrt{-2 \times \log_e \bar{R}}$ |
| | | $\bar{R} = \sqrt{\bar{\hat{x}}^2 + \bar{\hat{y}}^2} = \frac{1}{i}\sqrt{\left(\sum_{n=1}^{i}\cos\Theta_n\right)^2 + \left(\sum_{n=1}^{i}\sin\Theta_n\right)^2}$ |
| $(\bar{x})$ | | $\bar{r}\cos\bar{\Theta}$ |
| $(\bar{y})$ | | $\bar{r}\sin\bar{\Theta}$ |

S.D. : (Linear) Standard Deviation
C.S.D. : Circular Standard Deviation
$\hat{x}$ : the horizontal component of $\Theta$
$\hat{y}$ : the vertical component of $\Theta$
$R$ : the resultant length

FIG. 6

| Variable source | The Cartesian Coordinate System | The Polar Coordinate System |
|---|---|---|
| $P_0P_{mc}(P_0P_{mp})$ line segment magnitude | Not available | Linear statistical analysis $r_{mp} = \frac{1}{i}\sum_{n=1}^{i} r_n$ |
| | $|V_{md}| = \sqrt{x_{mc}^2 + y_{mc}^2}$ | Circular Directional data statistical analysis |
| $P_0P_{mc}(P_0P_{mp})$ line segment direction | Not available | $\Theta_{mp}$ |
| | $\theta_{mc} = \tan^{-1}\left(\frac{y_{mc}}{x_{mc}}\right)$ | |
| (x-coordinate) | Linear statistical analysis $x_{mc} = \frac{1}{i}\sum_{n=1}^{i} x_n$ | Not available |
| | | $r_{mp}\cos\Theta_{mp}$ |
| (y-coordinate) | Linear statistical analysis $y_{mc} = \frac{1}{i}\sum_{n=1}^{i} y_n$ | Not available |
| | | $r_{mp}\sin\Theta_{mp}$ |

▒ : The components and the statistical analysis method presently used.

FIG. 8

| $r\ (=e_r)$ | $\theta_d$ | $\|v_d\|$ | $r$ | $\theta_d$ | $\|v_d\|$ |
|---|---|---|---|---|---|
| 1 | 6.316° | 0.0015185 | 5 | 6.316° | 0.0075924 |
| 1 | 6.207° | 0.0014666 | 5 | 6.207° | 0.0073329 |
| 1 | 5.143° | 0.0010069 | 5 | 5.143° | 0.0050347 |
| 1 | 5.070° | 0.0009788 | 5 | 5.070° | 0.0048939 |
| 1 | 3.636° | 0.0005035 | 5 | 3.636° | 0.0025173 |
| 1 | 3.600° | 0.0004934 | 5 | 3.600° | 0.0024672 |
| 1 | 2.813° | 0.0003021 | 5 | 2.813° | 0.0015059 |
| 1 | 2.791° | 0.0002965 | 5 | 2.791° | 0.0014827 |
| 1 | 2.293° | 0.0002002 | 5 | 2.293° | 0.0010010 |
| 1 | 2.278° | 0.0001977 | 5 | 2.278° | 0.0009884 |
| 1 | 1.622° | 0.0001001 | 5 | 1.622° | 0.0005006 |
| 1 | 1.614° | 0.0000992 | 5 | 1.614° | 0.0004962 |

$P_1\ (r_1,\ \theta_1)$
$P_2\ (r_2,\ \theta_2)$
$P_{mc}$: Mean of $P_1$ and $P_2$ generated by the Cartesian coordinate system.
$P_{mp}$: Mean of $P_1$ and $P_2$ generated by the Polar coordinate system.
Here $r_1 = r_2 = r$, and $\theta_d = \theta_1 - \theta_2$, $|v_d| = |\overrightarrow{P_1P_2}|$

FIG. 10

| The Cartesian Coordinate System | | The Polar Coordinate System |
|---|---|---|
| $P_{mc}(x_{mc}, y_{mc}, z_{mc})$ | $\neq$** | $P_{mp}(r_{mp}, \Phi_{mp}, \Theta_{mp})$ |
| $xyV_{mc}$ with $\|xyV_{mc}\|$ and $\theta_{mc}$ | $\neq$** | $r_{mp}'$ with $r_{mp}'$ and $\Theta_{mp}$ |
| $xyzV_{mc}$ with $\|xyzV_{mc}\|$ and $\phi_{mc}$ | $\neq$** | $r_{mp}$ with $r_{mp}$ and $\Phi_{mp}$ |
| $\|xyV_{mc}\| = \sqrt{x_{mc}^2 + y_{mc}^2}$ | $\neq$* | $r_{mp}' = r_{mp} \cos \Phi_{mp}$ |
| $\|xyzV_{mc}\| = \sqrt{x_{mc}^2 + y_{mc}^2 + z_{mc}^2}$ | $\neq$* | $r_{mp} = \dfrac{r_1 + r_2}{2}$ |
| $\phi_{mc} = \tan^{-1}\left(\dfrac{z_{mc}}{\sqrt{x_{mc}^2 + y_{mc}^2}}\right)$ | $\neq$** | $\Phi_m = \dfrac{\Phi_1 + \Phi_2}{2}$ |
| $\theta_{mc} = \tan^{-1}\left(\dfrac{y_{mc}}{x_{mc}}\right)$ | $\neq$** | $\Theta_m = \dfrac{\Theta_1 + \Theta_2}{2}$ |
| $x_{mc} = \dfrac{x_1 + x_2}{2}$ | $\neq$** | $r_{mp} \cos \Phi_{mp} \cos \Theta_{mp}$ |
| $y_{mc} = \dfrac{y_1 + y_2}{2}$ | $\neq$** | $r_{mp} \cos \Phi_{mp} \sin \Theta_{mp}$ |
| $z_{mc} = \dfrac{z_1 + z_2}{2}$ | $\neq$** | $r_{mp} \sin \Phi_{mp}$ |

\* : Unless $P_0, P_1, P_2$ are colinear.

\*\* : Unless $P_0, P_1, P_2$ are colinear and $P_1, P_2$ are within the same octant.

 : The components presently used in the statistical analysis.

FIG. 14

| Variable | Data Set | Descriptive Statistics |
|---|---|---|
| $x$ | $x_1 \cdots x_i$ | |
| $y$ | $y_1 \cdots y_i$ | |
| $z$ | $z_1 \cdots z_i$ | |
| $\lvert xyV \rvert$ | $\sqrt{x_1^2+y_1^2} \cdots \sqrt{x_i^2+y_i^2}$ | $\lvert xyV \rvert = r'$, but $\overline{\lvert xyV \rvert} \neq \overline{r'}$ |
| $\lvert xyzV \rvert$ | $\sqrt{x_1^2+y_1^2+z_1^2} \cdots \sqrt{x_i^2+y_i^2+z_i^2}$ | $\lvert xyzV \rvert = r$, but $\overline{\lvert xyzV \rvert} \neq \overline{r}$ |
| $\theta$ | $\tan^{-1}\frac{y_1}{x_1} \cdots \tan^{-1}\frac{y_j}{x_j}$ | $\theta = \Theta$, but $\overline{\theta} \neq \overline{\Theta}$ |
| $\phi$ | $\tan^{-1}\frac{z_1}{\lvert xyV_1 \rvert} \cdots \tan^{-1}\frac{z_i}{\lvert xyV_i \rvert}$ | $\phi = \Phi$, but $\overline{\phi} \neq \overline{\Phi}$ |
| $r$ | $r_1 = \lvert xyzV_1 \rvert \cdots r_i = \lvert xyzV_i \rvert$ | $\overline{r} = \frac{1}{i}\sum_{n=1}^{i} r_n = \frac{1}{i}\sum_{n=1}^{i}\sqrt{x_n^2+y_n^2+z_n^2}$ |
| | | $S.D. = \sqrt{\frac{\sum_{n=1}^{i}(r_n - \overline{r})^2}{i-1}}$ |
| $\hat{x}$ | $\cos\Theta_1 \cdots \cos\Theta_i$ | $\overline{\hat{x}} = \frac{1}{i}\sum_{n=1}^{i}\cos\Theta_n$ |
| $\hat{y}$ | $\sin\Theta_1 \cdots \sin\Theta_i$ | $\overline{\hat{y}} = \frac{1}{i}\sum_{n=1}^{i}\sin\Theta_n$ |
| $\hat{z}$ | $\sin\Phi_1 \cdots \sin\Phi_i$ | $\overline{\hat{z}} = \frac{1}{i}\sum_{n=1}^{i}\sin\Phi_n$ |
| $\hat{r}'$ | $\cos\Phi_1 \cdots \cos\Phi_i$ | $\overline{\hat{r}'} = \frac{1}{i}\sum_{n=1}^{i}\cos\Phi_n$ |
| | here $e_r = \sqrt{\cos^2\Theta + \sin^2\Theta} = \sqrt{\cos^2\Phi + \sin^2\Phi} = 1$, so $\overline{e}_r = \frac{1}{i}\sum_{n=1}^{i} e_m = 1$ | |
| $\Phi$ | $\tan^{-1}\frac{\hat{z}_1}{\hat{r}_1'} \cdots \tan^{-1}\frac{\hat{z}_i}{\hat{r}_i'}$ | $\overline{\Phi} = \tan^{-1}\frac{\overline{\hat{z}}}{\overline{\hat{r}'}} = \tan^{-1}\frac{\frac{1}{i}\sum_{n=1}^{i}\sin\Phi_n}{\frac{1}{i}\sum_{n=1}^{i}\cos\Phi_n} = \tan^{-1}\frac{\sum_{n=1}^{i}\sin\Phi_n}{\sum_{n=1}^{i}\cos\Phi_n}$ |
| | | $C.S.D. = \sqrt{-2 \times \log_e \overline{R}}$ |
| | | $\overline{R} = \sqrt{\overline{\hat{r}'}^2 + \overline{\hat{z}}^2} = \frac{1}{i}\sqrt{\left(\sum_{n=1}^{i}\cos\Phi_n\right)^2 + \left(\sum_{n=1}^{i}\sin\Phi_n\right)^2}$ |
| $\Theta$ | $\tan^{-1}\frac{\hat{y}_1}{\hat{x}_1} \cdots \tan^{-1}\frac{\hat{y}_i}{\hat{x}_i}$ | $\overline{\Theta} = \tan^{-1}\frac{\overline{\hat{y}}}{\overline{\hat{x}}} = \tan^{-1}\frac{\frac{1}{i}\sum_{n=1}^{i}\sin\Theta_n}{\frac{1}{i}\sum_{n=1}^{i}\cos\Theta_n} = \tan^{-1}\frac{\sum_{n=1}^{i}\sin\Theta_n}{\sum_{n=1}^{i}\cos\Theta_n}$ |
| | | $C.S.D. = \sqrt{-2 \times \log_e \overline{R}'}$ |
| | | $\overline{R}' = \sqrt{\overline{\hat{x}}^2 + \overline{\hat{y}}^2} = \frac{1}{i}\sqrt{\left(\sum_{n=1}^{i}\cos\Theta_n\right)^2 + \left(\sum_{n=1}^{i}\sin\Theta_n\right)^2}$ |
| $\overline{r'}$ | | $\overline{r}\cos\overline{\Phi}$ |
| $(\overline{x})$ | | $\overline{r'}\cos\overline{\Theta}$ |
| $(\overline{y})$ | | $\overline{r'}\sin\overline{\Theta}$ |
| $(\overline{z})$ | | $\overline{r}\sin\overline{\Phi}$ |

$\hat{r}'$ : the horizontal component of $\Phi$, $\hat{z}$ : the vertical component of $\Phi$.

FIG. 15

| Variable source | The Cartesian Coordinate System | The Polar Coordinate System |
|---|---|---|
| $P_0P_{mc}(P_0P_{mp})$ line segment magnitude | Not available<br>$\|_{xyz}V_{md}\| = \sqrt{x_{mc}^2+y_{mc}^2+z_{mc}^2}$ | Linear statistical analysis<br>$r_{mp} = \frac{1}{i}\sum_{n=1}^{i} r_i$ |
| $P_0P_{mc}(P_0P_{mp})$ line segment direction | Not available<br>$\phi_{mc} = \tan^{-1}\left(\frac{y_{mc}}{x_{mc}}\right)$ | Circular Directional data statistical analysis<br>$\Phi_{mp}$ |
| $P_0P_{mc}(P_0P_{mp})$ line segment projection on the xy-plane, magnitude | Not available<br>$\|_{xy}V_{md}\| = \sqrt{x_{mc}^2+y_{mc}^2}$ | Not available<br>$r_{mp}' = r_{mp}\cos\Phi_{mp}$ |
| $P_0P_{mc}(P_0P_{mp})$ line segment projection on the xy-plane, direction | Not available<br>$\theta_{mc} = \tan^{-1}\left(\frac{y_{mc}}{x_{mc}}\right)$ | Circular Directional data statistical analysis<br>$\Theta_{mp}$ |
| (x-coordinate) | Linear statistical analysis<br>$x_{mc} = \frac{1}{i}\sum_{n=1}^{i} x_n$ | Not available<br>$r_{mp}\cos\Phi_{mp}\cos\Theta_{mp}$ |
| (y-coordinate) | Linear statistical analysis<br>$y_{mc} = \frac{1}{i}\sum_{n=1}^{i} y_n$ | Not available<br>$r_{mp}\cos\Phi_{mp}\sin\Theta_{mp}$ |
| (z-coordinate) | Linear statistical analysis<br>$z_{mc} = \frac{1}{i}\sum_{n=1}^{i} z_n$ | Not available<br>$r_{mp}\sin\Phi_{mp}$ |

☐ : The components and the statistical analysis method presently used.

FIG. 16

The original data in the Cartesian coordinate system

| Data Point | Centroid Point Position | Data Set | x | y | z | xy-vector Magnitude | xy-vector Direction | xyz-vector Magnitude | xyz-vector Direction |
|---|---|---|---|---|---|---|---|---|---|
| Centroid | 1 | bmc2-bmc1 | 0.007 | 0.009 | 0.001 | 0.0110 | 231.00 | 0.0110 | 5.19 |
| | | bmc2-bms3 | -0.006 | -0.001 | 0.000 | 0.0060 | 7.00 | 0.0060 | 0.00 |
| | 2 | bmc2-bmc1 | 0.004 | 0.009 | -0.005 | 0.0100 | 246.00 | 0.0112 | 333.43 |
| | | bmc2-bms3 | 0.018 | -0.001 | -0.001 | 0.0180 | 176.00 | 0.0180 | 356.82 |
| | 3 | bmc2-bmc1 | 0.017 | -0.012 | 0.007 | 0.0210 | 144.00 | 0.0221 | 18.43 |
| | | bmc2-bms3 | 0.008 | -0.006 | 0.008 | 0.0100 | 140.00 | 0.0128 | 38.66 |
| | 4 | bmc2-bmc1 | -0.006 | -0.011 | -0.009 | 0.0130 | 61.00 | 0.0158 | 325.30 |
| | | bmc2-bms3 | -0.008 | -0.014 | 0.002 | 0.0160 | 58.00 | 0.0161 | 7.13 |
| | 5 | bmc2-bmc1 | 0.008 | -0.007 | -0.004 | 0.0110 | 139.00 | 0.0117 | 340.02 |
| | | bmc2-bms3 | -0.002 | -0.003 | 0.002 | 0.0040 | 55.00 | 0.0045 | 26.57 |
| Angular Gap Point | 1 | bmc2-bmc1 | 0.770 | 2.114 | 0.009 | 2.2500 | 250.00 | 2.2500 | 0.23 |
| | | bmc2-bms3 | -1.949 | 1.125 | 0.002 | 2.2500 | 330.00 | 2.2500 | 0.05 |
| | 2 | bmc2-bmc1 | 0.582 | 2.173 | 0.002 | 2.2500 | 255.00 | 2.2500 | 0.05 |
| | | bmc2-bms3 | 2.101 | 0.806 | 0.011 | 2.2500 | 201.00 | 2.2500 | 0.28 |
| | 3 | bmc2-bmc1 | 1.968 | -1.091 | 0.022 | 2.2499 | 151.00 | 2.2500 | 0.56 |
| | | bmc2-bms3 | 2.071 | -0.879 | 0.020 | 2.2499 | 157.00 | 2.2500 | 0.50 |
| | 4 | bmc2-bmc1 | -0.157 | -2.245 | -0.002 | 2.2500 | 86.00 | 2.2500 | 359.96 |
| | | bmc2-bms3 | -1.021 | -2.005 | 0.012 | 2.2500 | 63.00 | 2.2500 | 0.29 |
| | 5 | bmc2-bmc1 | 2.250 | 0.039 | 0.003 | 2.2500 | 181.00 | 2.2500 | 0.08 |
| | | bmc2-bms3 | 1.929 | -1.159 | 0.011 | 2.2500 | 149.00 | 2.2500 | 0.27 |

FIG. 18

The descriptive statistics in the Cartesian coordinate system

| Data Point | Centroid Point Position | | x | y | z | xy-vector Magnitude | xy-vector Direction | xyz-xector Magnitude | xyz-xector Direction |
|---|---|---|---|---|---|---|---|---|---|
| Centroid | 1 | Mean | 0.000 | 0.004 | 0.001 | 0.0039 | 262.95 | 0.0040 | 0.00 |
| | | S.D. | 0.009 | 0.007 | 0.001 | | | | |
| | 2 | Mean | 0.011 | 0.004 | -0.003 | 0.0117 | 199.69 | 0.0121 | 359.99 |
| | | S.D. | 0.010 | 0.007 | 0.003 | | | | |
| | 3 | Mean | 0.012 | -0.009 | 0.008 | 0.0155 | 142.71 | 0.0172 | 0.00 |
| | | S.D. | 0.007 | 0.004 | 0.001 | | | | |
| | 4 | Mean | -0.007 | -0.012 | -0.004 | 0.0145 | 59.34 | 0.0149 | 360.00 |
| | | S.D. | 0.002 | 0.002 | 0.008 | | | | |
| | 5 | Mean | 0.003 | -0.005 | -0.001 | 0.0060 | 119.79 | 0.0061 | 360.00 |
| | | S.D. | 0.007 | 0.003 | 0.004 | | | | |
| Angular Gap Point | 1 | Mean | -0.590 | 1.620 | 0.006 | 1.7236 | 290.00 | 1.7236 | 0.00 |
| | | S.D. | 1.922 | 0.700 | 0.005 | | | | |
| | 2 | Mean | 1.341 | 1.490 | 0.007 | 2.0048 | 228.00 | 2.0048 | 0.01 |
| | | S.D. | 1.074 | 0.967 | 0.006 | | | | |
| | 3 | Mean | 2.019 | -0.985 | 0.021 | 2.2468 | 154.00 | 2.2469 | 0.00 |
| | | S.D. | 0.073 | 0.150 | 0.002 | | | | |
| | 4 | Mean | -0.589 | -2.125 | 0.005 | 2.2048 | 74.50 | 2.2048 | 0.00 |
| | | S.D. | 0.611 | 0.170 | 0.009 | | | | |
| | 5 | Mean | 2.089 | -0.560 | 0.007 | 2.1628 | 165.00 | 2.1628 | 0.00 |
| | | S.D. | 0.227 | 0.847 | 0.005 | | | | |

FIG. 19

The descriptive statistics in the Polar coordinate system

| Data Point | Centroid Point Position | | x | y | z | r' Magnitude | r' Direction | r' Magnitude | r' Direction | r Magnitude | r Direction |
|---|---|---|---|---|---|---|---|---|---|---|---|
| Centroid | 1 | Mean | -0.004 | 0.007 | 0.000 | 0.0085 | 299.00 | 0.0085 | 299.00 | 0.0085 | 2.60 |
|  |  | C.S.D. |  |  |  |  | 80.29 | 0.0036 | 80.29 | 0.0036 | 2.60 |
|  | 2 | Mean | 0.012 | 0.007 | -0.004 | 0.0141 | 211.00 | 0.0146 | 345.13 | 0.0146 | 345.13 |
|  |  | C.S.D. |  |  |  |  | 36.19 | 0.0048 | 11.73 | 0.0048 | 11.73 |
|  | 3 | Mean | 0.012 | -0.009 | 0.008 | 0.0153 | 142.00 | 0.0175 | 28.55 | 0.0175 | 28.55 |
|  |  | C.S.D. |  |  |  |  | 2.00 | 0.0066 | 10.14 | 0.0066 | 10.14 |
|  | 4 | Mean | -0.008 | -0.013 | -0.004 | 0.0155 | 59.50 | 0.0160 | 346.21 | 0.0160 | 346.21 |
|  |  | C.S.D. |  |  |  |  | 1.50 | 0.0002 | 21.15 | 0.0002 | 21.15 |
|  | 5 | Mean | 0.001 | -0.008 | 0.000 | 0.0081 | 97.00 | 0.0081 | 3.29 | 0.0081 | 3.29 |
|  |  | C.S.D. |  |  |  |  | 44.15 | 0.0051 | 23.61 | 0.0051 | 23.61 |
| Angular Gap Point | 1 | Mean | -0.770 | 2.114 | 0.006 | 2.2500 | 290.00 | 2.2500 | 0.14 | 2.2500 | 0.14 |
|  |  | C.S.D. |  |  |  |  | 41.83 | 0.0000 | 0.09 | 0.0000 | 0.09 |
|  | 2 | Mean | 1.506 | 1.672 | 0.007 | 2.2500 | 228.00 | 2.2500 | 0.17 | 2.2500 | 0.17 |
|  |  | C.S.D. |  |  |  |  | 27.53 | 0.0000 | 0.11 | 0.0000 | 0.11 |
|  | 3 | Mean | 2.022 | -0.986 | 0.021 | 2.2499 | 154.00 | 2.2500 | 0.53 | 2.2500 | 0.53 |
|  |  | C.S.D. |  |  |  |  | 3.00 | 0.0000 | 0.03 | 0.0000 | 0.03 |
|  | 4 | Mean | -0.601 | -2.168 | 0.005 | 2.2500 | 74.50 | 2.2500 | 0.13 | 2.2500 | 0.13 |
|  |  | C.S.D. |  |  |  |  | 11.54 | 0.0000 | 0.17 | 0.0000 | 0.17 |
|  | 5 | Mean | 2.173 | -0.582 | 0.007 | 2.2500 | 165.00 | 2.2500 | 0.17 | 2.2500 | 0.17 |
|  |  | C.S.D. |  |  |  |  | 16.11 | 0.0000 | 0.10 | 0.0000 | 0.10 |

C.S.D. : Circular Standard Deviation

FIG. 20

The difference of the means of the Polar and the Cartesian coordinate system

| Coordinate System | Data Point | Centroid Point Position | x | y | z | r' or xy-vector | | r or xyz-xector | |
|---|---|---|---|---|---|---|---|---|---|
| | | | | | | Magnitude | Direction | Magnitude | Direction |
| Polar coordinate system | Centroid | 1 | -0.004 | 0.007 | 0.000 | 0.0085 | 299.00 | 0.0085 | 2.60 |
| | | 2 | 0.012 | 0.007 | -0.004 | 0.0141 | 211.00 | 0.0146 | 345.13 |
| | | 3 | 0.012 | -0.009 | 0.008 | 0.0153 | 142.00 | 0.0175 | 28.55 |
| | | 4 | -0.008 | -0.013 | -0.004 | 0.0155 | 59.50 | 0.0160 | 346.21 |
| | | 5 | 0.001 | -0.008 | 0.000 | 0.0081 | 97.00 | 0.0081 | 3.29 |
| | Angular Gap Point | 1 | -0.770 | 2.114 | 0.006 | 2.2500 | 290.00 | 2.2500 | 0.14 |
| | | 2 | 1.506 | 1.672 | 0.007 | 2.2500 | 228.00 | 2.2500 | 0.17 |
| | | 3 | 2.022 | -0.986 | 0.021 | 2.2499 | 154.00 | 2.2500 | 0.53 |
| | | 4 | -0.601 | -2.168 | 0.005 | 2.2500 | 74.50 | 2.2500 | 0.13 |
| | | 5 | 2.173 | -0.582 | 0.007 | 2.2500 | 165.00 | 2.2500 | 0.17 |
| Cartesian coordinate system | Centroid | 1 | 0.000 | 0.004 | 0.001 | 0.0039 | 262.95 | 0.0040 | 0.00 |
| | | 2 | 0.011 | 0.004 | -0.003 | 0.0117 | 199.69 | 0.0121 | 359.99 |
| | | 3 | 0.012 | -0.009 | 0.008 | 0.0155 | 142.71 | 0.0172 | 0.00 |
| | | 4 | -0.007 | -0.012 | -0.004 | 0.0145 | 59.34 | 0.0149 | 360.00 |
| | | 5 | 0.003 | -0.005 | -0.001 | 0.0060 | 119.79 | 0.0061 | 360.00 |
| | Angular Gap Point | 1 | -0.590 | 1.620 | 0.006 | 1.7236 | 290.00 | 1.7236 | 0.00 |
| | | 2 | 1.341 | 1.490 | 0.007 | 2.0048 | 228.00 | 2.0048 | 0.01 |
| | | 3 | 2.019 | -0.985 | 0.021 | 2.2468 | 154.00 | 2.2469 | 0.00 |
| | | 4 | -0.589 | -2.125 | 0.005 | 2.2048 | 74.50 | 2.2048 | 0.00 |
| | | 5 | 2.089 | -0.560 | 0.007 | 2.1628 | 165.00 | 2.1628 | 0.00 |
| The difference of Polar - Cartesian | Centroid | 1 | -0.005 | 0.004 | 0.000 | 0.0046 | 36.05 | 0.0046 | 2.60 |
| | | 2 | 0.001 | 0.003 | -0.001 | 0.0024 | 11.31 | 0.0025 | 14.86 |
| | | 3 | 0.000 | 0.000 | 0.001 | -0.0001 | 0.71 | 0.0003 | 28.55 |
| | | 4 | 0.000 | -0.001 | 0.000 | 0.0010 | 0.16 | 0.0011 | 13.78 |
| | | 5 | -0.002 | -0.003 | 0.001 | 0.0020 | 22.79 | 0.0020 | 3.29 |
| | Angular Gap Point | 1 | -0.180 | 0.495 | 0.000 | 0.5264 | 0.00 | 0.5264 | 0.14 |
| | | 2 | 0.164 | 0.182 | 0.000 | 0.2452 | 0.00 | 0.2452 | 0.16 |
| | | 3 | 0.003 | -0.001 | 0.000 | 0.0031 | 0.00 | 0.0031 | 0.52 |
| | | 4 | -0.012 | -0.044 | 0.000 | 0.0452 | 0.00 | 0.0452 | 0.13 |
| | | 5 | 0.084 | -0.023 | 0.000 | 0.0872 | 0.00 | 0.0872 | 0.17 |

FIG. 21

The Location of the right centroid point of the welding condition model

| Welding Method | x | y | z | xy | xyz | θ | φ |
|---|---|---|---|---|---|---|---|
| BT | 5.001368 | 1.404034 | 0.053387 | 5.194706 | 5.194980 | 15.581026° | 0.588819° |
| BT | 5.001368 | 1.404034 | 0.053387 | 5.194706 | 5.194980 | 15.581026° | 0.588819° |
| BT | 5.001368 | 1.404034 | 0.053387 | 5.194706 | 5.194980 | 15.581026° | 0.588819° |
| BT | 5.117661 | 0.921862 | 0.025103 | 5.200027 | 5.200087 | 10.211361° | 0.276592° |
| BT | 5.117661 | 0.921862 | 0.025103 | 5.200027 | 5.200087 | 10.211361° | 0.276592° |
| BT | 5.117661 | 0.921862 | 0.025103 | 5.200027 | 5.200087 | 10.211361° | 0.276592° |
| BT | 5.104542 | 1.108830 | 0.037416 | 5.223586 | 5.223720 | 12.255625° | 0.410397° |
| BT | 5.104542 | 1.108830 | 0.037416 | 5.223586 | 5.223720 | 12.255625° | 0.410397° |
| BT | 5.104542 | 1.108830 | 0.037416 | 5.223586 | 5.223720 | 12.255625° | 0.410397° |
| BTM | 5.073029 | 1.082421 | 0.022578 | 5.187220 | 5.187269 | 12.044459° | 0.249385° |
| BTM | 5.073029 | 1.082421 | 0.022578 | 5.187220 | 5.187269 | 12.044459° | 0.249385° |
| BTM | 5.073029 | 1.082421 | 0.022578 | 5.187220 | 5.187269 | 12.044459° | 0.249385° |
| BTM | 5.099342 | 1.089876 | 0.038780 | 5.214510 | 5.214655 | 12.064243° | 0.426097° |
| BTM | 5.099342 | 1.089876 | 0.038780 | 5.214510 | 5.214655 | 12.064243° | 0.426097° |
| BTM | 5.099342 | 1.089876 | 0.038780 | 5.214510 | 5.214655 | 12.064243° | 0.426097° |
| BTM | 5.071652 | 1.076540 | 0.019759 | 5.184649 | 5.184687 | 11.984080° | 0.218362° |
| BTM | 5.071652 | 1.076540 | 0.019759 | 5.184649 | 5.184687 | 11.984080° | 0.218362° |
| BTM | 5.071652 | 1.076540 | 0.019759 | 5.184649 | 5.184687 | 11.984080° | 0.218362° |
| CT | 5.037609 | 1.219164 | 0.027311 | 5.183036 | 5.183108 | 13.604707° | 0.301901° |
| CT | 5.037609 | 1.219164 | 0.027311 | 5.183036 | 5.183108 | 13.604707° | 0.301901° |
| CT | 5.037609 | 1.219164 | 0.027311 | 5.183036 | 5.183108 | 13.604707° | 0.301901° |
| CT | 5.112156 | 1.051079 | 0.073127 | 5.219090 | 5.219603 | 11.618320° | 0.802739° |
| CT | 5.112156 | 1.051079 | 0.073127 | 5.219090 | 5.219603 | 11.618320° | 0.802739° |
| CT | 5.112156 | 1.106579 | 0.073127 | 5.230550 | 5.231061 | 12.213825° | 0.800980° |
| CT | 5.040816 | 1.162720 | 0.046708 | 5.173177 | 5.173388 | 12.988724° | 0.517297° |
| CT | 5.040816 | 1.162720 | 0.046708 | 5.173177 | 5.173388 | 12.988724° | 0.517297° |
| CT | 5.040816 | 1.162720 | 0.046708 | 5.173177 | 5.173388 | 12.988724° | 0.517297° |
| CTS | 5.128266 | 0.949745 | 0.075842 | 5.215470 | 5.216021 | 10.492192° | 0.833122° |
| CTS | 5.128266 | 0.949745 | 0.075842 | 5.215470 | 5.216021 | 10.492192° | 0.833122° |
| CTS | 5.128266 | 0.949745 | 0.075842 | 5.215470 | 5.216021 | 10.492192° | 0.833122° |
| CTS | 5.066929 | 1.285067 | 0.202179 | 5.227348 | 5.231256 | 14.231207° | 2.214934° |
| CTS | 5.066929 | 1.285067 | 0.202179 | 5.227348 | 5.231256 | 14.231207° | 2.214934° |
| CTS | 5.066929 | 1.285067 | 0.202179 | 5.227348 | 5.231256 | 14.231207° | 2.214934° |
| CTS | 5.039040 | 1.214385 | 0.021106 | 5.183305 | 5.183348 | 13.549636° | 0.233297° |
| CTS | 5.039040 | 1.214385 | 0.021106 | 5.183305 | 5.183348 | 13.549636° | 0.233297° |
| CTS | 5.039040 | 1.214385 | 0.021106 | 5.183305 | 5.183348 | 13.549636° | 0.233297° |
| ST | 5.021435 | 1.322708 | 0.063549 | 5.192722 | 5.193111 | 14.757197° | 0.701156° |
| ST | 5.021435 | 1.322708 | 0.063549 | 5.192722 | 5.193111 | 14.757197° | 0.701156° |
| ST | 5.021435 | 1.322708 | 0.063549 | 5.192722 | 5.193111 | 14.757197° | 0.701156° |
| ST | 5.105290 | 1.010267 | 0.100252 | 5.204289 | 5.205254 | 11.193439° | 1.103566° |
| ST | 5.105290 | 1.010267 | 0.100252 | 5.204289 | 5.205254 | 11.193439° | 1.103566° |
| ST | 5.105290 | 1.010267 | 0.100252 | 5.204289 | 5.205254 | 11.193439° | 1.103566° |
| ST | 5.056759 | 1.120001 | 0.013510 | 5.179306 | 5.179324 | 12.488601° | 0.149448° |
| ST | 5.056759 | 1.120001 | 0.013510 | 5.179306 | 5.179324 | 12.488601° | 0.149448° |
| ST | 5.056759 | 1.120001 | 0.013510 | 5.179306 | 5.179324 | 12.488601° | 0.149448° |
| STC | 5.114617 | 0.973601 | 0.014366 | 5.206458 | 5.206477 | 10.777680° | 0.158088° |
| STC | 5.114617 | 0.973601 | 0.014366 | 5.206458 | 5.206477 | 10.777680° | 0.158088° |
| STC | 5.114617 | 0.973601 | 0.014366 | 5.206458 | 5.206477 | 10.777680° | 0.158088° |
| STC | 5.156807 | 0.594084 | 0.116693 | 5.190915 | 5.192226 | 6.571723° | 1.287800° |
| STC | 5.156807 | 0.594084 | 0.116693 | 5.190915 | 5.192226 | 6.571723° | 1.287800° |
| STC | 5.156807 | 0.594084 | 0.116693 | 5.190915 | 5.192226 | 6.571723° | 1.287800° |
| STC | 4.907986 | 1.192610 | 0.162656 | 5.050806 | 5.053425 | 13.657811° | 1.844508° |
| STC | 4.907986 | 1.192610 | 0.162656 | 5.050806 | 5.053425 | 13.657811° | 1.844508° |
| STC | 4.907986 | 1.192610 | 0.162656 | 5.050806 | 5.053425 | 13.657811° | 1.844508° |

The Horizontal Direction of the xyz-vector : θ
The Vertical Direction of the xyz-vector : φ
The Projection Length of xyz-vector on the xy-plane with the direction θ : xy-vector

FIG. 23a

The Location of the right centroid point of the welded bar

| Welding Method | x | y | z | xy | xyz | θ | φ |
|---|---|---|---|---|---|---|---|
| BT | 4.998640 | 1.429860 | 0.052429 | 5.199125 | 5.199389 | 15.963162° | 0.577762° |
| BT | 5.002409 | 1.434216 | 0.048847 | 5.203948 | 5.204177 | 15.997860° | 0.537787° |
| BT | 5.017084 | 1.424939 | 0.047236 | 5.215523 | 5.215737 | 15.865439° | 0.518903° |
| BT | 5.116595 | 0.930278 | 0.019424 | 5.200477 | 5.200513 | 10.304717° | 0.214001° |
| BT | 5.085470 | 0.940408 | 0.022241 | 5.171659 | 5.171737 | 10.476813° | 0.246401° |
| BT | 5.091336 | 0.922246 | 0.023598 | 5.174190 | 5.174244 | 10.267244° | 0.261308° |
| BT | 5.135060 | 1.109785 | 0.036251 | 5.253614 | 5.253739 | 12.195159° | 0.395455° |
| BT | 5.142454 | 1.107742 | 0.037083 | 5.260420 | 5.260551 | 12.156374° | 0.403902° |
| BT | 5.149444 | 1.111924 | 0.034802 | 5.268126 | 5.268241 | 12.184850° | 0.378499° |
| BTM | 5.108893 | 1.093957 | 0.015057 | 5.224703 | 5.224725 | 12.086118° | 0.165114° |
| BTM | 5.118749 | 1.107396 | 0.017515 | 5.237167 | 5.237196 | 12.207301° | 0.191623° |
| BTM | 5.113935 | 1.104030 | 0.016688 | 5.231790 | 5.231777 | 12.182426° | 0.182534° |
| BTM | 5.103165 | 1.094138 | 0.029113 | 5.219141 | 5.219222 | 12.101237° | 0.319589° |
| BTM | 5.098785 | 1.083957 | 0.035105 | 5.212731 | 5.212849 | 12.001697° | 0.385846° |
| BTM | 5.093173 | 1.097514 | 0.034140 | 5.210081 | 5.210193 | 12.160563° | 0.375430° |
| BTM | 5.101232 | 1.102862 | 0.020873 | 5.219087 | 5.219129 | 12.199321° | 0.229140° |
| BTM | 5.083216 | 1.087026 | 0.020180 | 5.198146 | 5.198186 | 12.070670° | 0.222424° |
| BTM | 5.090999 | 1.084309 | 0.020998 | 5.205189 | 5.205231 | 12.023608° | 0.231133° |
| CT | 5.049514 | 1.223223 | 0.021784 | 5.195582 | 5.195607 | 13.617333° | 0.240229° |
| CT | 5.065987 | 1.211138 | 0.019292 | 5.208749 | 5.208785 | 13.445453° | 0.212204° |
| CT | 5.066805 | 1.217442 | 0.021953 | 5.211015 | 5.211061 | 13.510797° | 0.241375° |
| CT | 5.096868 | 1.059241 | 0.087962 | 5.205771 | 5.206514 | 11.740199° | 0.968036° |
| CT | 5.112584 | 1.048839 | 0.082163 | 5.219019 | 5.219666 | 11.591141° | 0.901938° |
| CT | 5.103297 | 1.050663 | 0.082522 | 5.210329 | 5.210983 | 11.633459° | 0.907384° |
| CT | 5.094401 | 1.182238 | 0.054781 | 5.225296 | 5.225583 | 12.851523° | 0.600656° |
| CT | 5.088791 | 1.189859 | 0.054091 | 5.222503 | 5.222783 | 12.944283° | 0.593408° |
| CT | 5.089925 | 1.175287 | 0.056220 | 5.223652 | 5.224144 | 13.001974° | 0.605836° |
| CTS | 5.135600 | 0.978458 | 0.059626 | 5.227979 | 5.228319 | 10.786978° | 0.653434° |
| CTS | 5.140816 | 0.972150 | 0.064371 | 5.231927 | 5.232323 | 10.708417° | 0.704897° |
| CTS | 5.153803 | 0.973799 | 0.065965 | 5.244994 | 5.245409 | 10.689757° | 0.720557° |
| CTS | 5.119652 | 1.326430 | 0.201672 | 5.288691 | 5.292535 | 14.525146° | 2.183779° |
| CTS | 5.111233 | 1.318583 | 0.205060 | 5.278576 | 5.282557 | 14.465618° | 2.224685° |
| CTS | 5.090693 | 1.311191 | 0.203358 | 5.256841 | 5.260773 | 14.443528° | 2.215351° |
| CTS | 5.090302 | 1.210384 | 0.019114 | 5.232227 | 5.232262 | 13.375526° | 0.209308° |
| CTS | 5.086698 | 1.219293 | 0.020140 | 5.230791 | 5.230829 | 13.479597° | 0.220596° |
| CTS | 5.071214 | 1.214702 | 0.020710 | 5.214663 | 5.214704 | 13.470200° | 0.227549° |
| ST | 5.028614 | 1.327714 | 0.072598 | 5.200940 | 5.201447 | 14.790362° | 0.799713° |
| ST | 5.014215 | 1.324246 | 0.072192 | 5.186133 | 5.186636 | 14.793941° | 0.797517° |
| ST | 5.026280 | 1.318892 | 0.074177 | 5.196438 | 5.196967 | 14.702902° | 0.817816° |
| ST | 5.141440 | 1.002651 | 0.139789 | 5.238273 | 5.240138 | 11.033865° | 1.528632° |
| ST | 5.120454 | 0.999080 | 0.139409 | 5.217012 | 5.218874 | 11.040585° | 1.530668° |
| ST | 5.121041 | 1.009735 | 0.142080 | 5.219638 | 5.221571 | 11.154152° | 1.559222° |
| ST | 5.134200 | 1.112459 | 0.015258 | 5.253339 | 5.253361 | 12.225846° | 0.166406° |
| ST | 5.121513 | 1.110074 | 0.016880 | 5.240436 | 5.240462 | 12.229534° | 0.184550° |
| ST | 5.122743 | 1.096590 | 0.017087 | 5.238798 | 5.238826 | 12.082559° | 0.186658° |
| STC | 5.121454 | 0.999712 | 0.001868 | 5.218114 | 5.218114 | 11.045288° | 0.020505° |
| STC | 5.115372 | 0.993338 | 0.005981 | 5.211907 | 5.211911 | 10.987219° | 0.065745° |
| STC | 5.119568 | 0.996253 | 0.007871 | 5.215601 | 5.215607 | 11.011968° | 0.086472° |
| STC | 5.175878 | 0.615870 | 0.105267 | 5.212390 | 5.213453 | 6.785835° | 1.156962° |
| STC | 5.170390 | 0.595700 | 0.104420 | 5.204595 | 5.205640 | 6.572278° | 1.149368° |
| STC | 5.174394 | 0.610797 | 0.104186 | 5.210319 | 5.211361 | 6.732163° | 1.145539° |
| STC | 4.961332 | 1.207189 | 0.174479 | 5.106086 | 5.109066 | 13.675430° | 1.957081° |
| STC | 4.944457 | 1.202421 | 0.176379 | 5.088562 | 5.091618 | 13.668188° | 1.985178° |
| STC | 4.962740 | 1.190697 | 0.171701 | 5.103581 | 5.106469 | 13.491799° | 1.926883° |

The Horizontal Direction of the xyz-vector : θ
The Vertical Direction of the xyz-vector : φ
The Projection Length of xyz-vector on the xy-plane with the direction θ : xy-vector

FIG. 23b

**Mean and S.D. of the Right Point Location
Analyzed by the Traditional Cartesian Coordinate System Method**

| Cartesian Coordinate System Method | n | x Mean | x S.D. | y Mean | y S.D. | z Mean | z S.D. | xy-vector Length Mean | xyz-vector Length Mean | xyz-vector $\phi$ Mean | xyz-vector $\theta$ Mean |
|---|---|---|---|---|---|---|---|---|---|---|---|
| BT, Cast | 9 | 5.075 | 0.055 | 1.145 | 0.211 | 0.039 | 0.012 | 5.203 | 5.203 | 0.429 | 12.714 |
| BT, Weld | 9 | 5.082 | 0.061 | 1.157 | 0.219 | 0.036 | 0.012 | 5.212 | 5.212 | 0.396 | 12.826 |
| BTM, Cast | 9 | 5.081 | 0.014 | 1.083 | 0.006 | 0.027 | 0.009 | 5.195 | 5.195 | 0.298 | 12.032 |
| BTM, Weld | 9 | 5.101 | 0.011 | 1.095 | 0.009 | 0.023 | 0.008 | 5.217 | 5.217 | 0.253 | 12.115 |
| CT, Cast | 9 | 5.064 | 0.036 | 1.150 | 0.067 | 0.049 | 0.020 | 5.193 | 5.193 | 0.541 | 12.794 |
| CT, Weld | 9 | 5.085 | 0.020 | 1.146 | 0.073 | 0.053 | 0.027 | 5.213 | 5.213 | 0.583 | 12.700 |
| CTS, Cast | 9 | 5.078 | 0.040 | 1.150 | 0.153 | 0.100 | 0.080 | 5.207 | 5.208 | 1.100 | 12.760 |
| CTS, Weld | 9 | 5.111 | 0.028 | 1.169 | 0.153 | 0.096 | 0.083 | 5.243 | 5.244 | 1.049 | 12.883 |
| ST, Cast | 9 | 5.061 | 0.036 | 1.151 | 0.137 | 0.059 | 0.038 | 5.190 | 5.191 | 0.651 | 12.813 |
| ST, Weld | 9 | 5.092 | 0.053 | 1.145 | 0.142 | 0.077 | 0.054 | 5.219 | 5.220 | 0.845 | 12.673 |
| STC, Cast | 9 | 5.060 | 0.115 | 0.920 | 0.262 | 0.098 | 0.066 | 5.143 | 5.144 | 1.092 | 10.305 |
| STC, Weld | 9 | 5.083 | 0.098 | 0.935 | 0.261 | 0.095 | 0.074 | 5.168 | 5.169 | 1.053 | 10.423 |

The Horizontal Direction of the xyz-vector : $\theta$
The Vertical Direction of the xyz-vector : $\phi$
The Projection Length of xyz-vector on the xy-plane with the direction $\theta$ : xy-vector

FIG. 24a

**Mean, S.D. and C.S.D. of the Right Point Location
Analyzed by the New Polar Coordinate System Method***

| Polar Coordinate System Method | n | x Mean | y Mean | z Mean | r' Length Mean | ray (r) Length Mean | ray (r) Length S.D. | ray (r) $\Phi$ Mean | ray (r) $\Phi$ C.S.D. | ray (r) $\Theta$ Mean | ray (r) $\Theta$ C.S.D. |
|---|---|---|---|---|---|---|---|---|---|---|---|
| BT, Cast | 9 | 5.078 | 1.146 | 0.039 | 5.206 | 5.206 | 0.013 | 0.425 | 0.128 | 12.716 | 2.257 |
| BT, Weld | 9 | 5.086 | 1.158 | 0.036 | 5.216 | 5.216 | 0.036 | 0.393 | 0.126 | 12.822 | 2.328 |
| BTM, Cast | 9 | 5.081 | 1.083 | 0.027 | 5.195 | 5.196 | 0.014 | 0.298 | 0.091 | 12.031 | 0.034 |
| BTM, Weld | 9 | 5.101 | 1.095 | 0.023 | 5.218 | 5.218 | 0.012 | 0.256 | 0.078 | 12.115 | 0.072 |
| CT, Cast | 9 | 5.064 | 1.151 | 0.049 | 5.193 | 5.193 | 0.023 | 0.540 | 0.205 | 12.803 | 0.759 |
| CT, Weld | 9 | 5.086 | 1.147 | 0.053 | 5.214 | 5.214 | 0.010 | 0.586 | 0.284 | 12.704 | 0.783 |
| CTS, Cast | 9 | 5.081 | 1.150 | 0.099 | 5.209 | 5.210 | 0.021 | 1.094 | 0.830 | 12.758 | 1.626 |
| CTS, Weld | 9 | 5.114 | 1.170 | 0.095 | 5.246 | 5.247 | 0.026 | 1.040 | 0.848 | 12.884 | 1.580 |
| ST, Cast | 9 | 5.063 | 1.151 | 0.059 | 5.192 | 5.193 | 0.011 | 0.651 | 0.391 | 12.813 | 1.473 |
| ST, Weld | 9 | 5.094 | 1.145 | 0.077 | 5.221 | 5.222 | 0.023 | 0.841 | 0.556 | 12.673 | 1.546 |
| STC, Cast | 9 | 5.066 | 0.924 | 0.099 | 5.150 | 5.151 | 0.073 | 1.097 | 0.702 | 10.336 | 2.910 |
| STC, Weld | 9 | 5.089 | 0.938 | 0.095 | 5.175 | 5.176 | 0.055 | 1.055 | 0.778 | 10.441 | 2.853 |

Circular Standard Deviation : C.S.D.
The Horizontal Direction of the ray : $\Theta$
The Vertical Direction of the ray : $\Phi$
The Projection Length of the ray ( r ) on the r $\Theta$ plane with the Direction $\Theta$ : r'

FIG. 24b p-value of Pairwise Comparison by the Cartesian and Polar Coordinate System Approaches

| Original Measured Data | Cartesian Coordinate System Method | | | Polar Coordinate System Method | | |
|---|---|---|---|---|---|---|
| Cast vs. Weld | $x^*$ | $y^*$ | $z^*$ | $r^*$ | $\phi^*$ | $\theta^*$ |
| BT | 0.4279 | 0.0181 | 0.0038 | 0.2681 | 0.6141 | 0.9273 |
| BTM | 0.0134 | 0.0088 | 0.0208 | 0.0117 | 0.3382 | 0.0088 |
| CT | 0.0359 | 0.5665 | 0.1594 | 0.0555 | 0.7201 | 0.7998 |
| CTS | 0.0004 | 0.0054 | 0.0972 | 0.0002 | 0.8996 | 0.8769 |
| ST | 0.0171 | 0.0512 | 0.0161 | 0.0159 | 0.4411 | 0.8547 |
| STC | 0.0090 | 0.0019 | 0.4176 | 0.0041 | 0.9113 | 0.9426 |

\* : Student's Paired t-test for Linear data Statistcal Analysis
\* : Watson's Paired F test for Directional Data Analysis

FIG. 25

The Difference between the Cast and Welded Bar Means
Analyzed by the Traditional Cartesian Coordinate System Method

| | n | x | y | z | xy-vector Length | xyz-vector Length | φ | θ |
|---|---|---|---|---|---|---|---|---|
| BT | 9 | 0.007 | 0.012 | -0.003 | 0.009 | 0.009 | -0.034 | 0.112 |
| BTM | 9 | 0.020 | 0.012 | -0.004 | 0.022 | 0.022 | -0.045 | 0.083 |
| CT | 9 | 0.021 | -0.004 | 0.004 | 0.020 | 0.020 | 0.042 | -0.094 |
| CTS | 9 | 0.033 | 0.019 | -0.004 | 0.036 | 0.036 | -0.051 | 0.123 |
| ST | 9 | 0.031 | -0.006 | 0.018 | 0.029 | 0.029 | 0.194 | -0.140 |
| STC | 9 | 0.023 | 0.015 | -0.003 | 0.025 | 0.025 | -0.039 | 0.118 |

The Horizontal Direction of the xyz-vector : θ
The Vertical Direction of the xyz-vector : φ
The Projection Length of xyz-vector on the xy-plane with the direction θ : xy-vector

FIG. 26a

The Difference between the Cast and the Welded Bar Means
Analyzed by Rui's Polar Coordinate System Method*

| | n | x | y | z | r' Length | r Length | r Φ | r Θ |
|---|---|---|---|---|---|---|---|---|
| BT | 9 | 0.008 | 0.012 | -0.003 | 0.010 | 0.010 | -0.033 | 0.106 |
| BTM | 9 | 0.020 | 0.012 | -0.004 | 0.022 | 0.022 | -0.042 | 0.084 |
| CT | 9 | 0.022 | -0.004 | 0.004 | 0.021 | 0.021 | 0.045 | -0.099 |
| CTS | 9 | 0.033 | 0.019 | -0.004 | 0.037 | 0.036 | -0.054 | 0.126 |
| ST | 9 | 0.031 | -0.006 | 0.018 | 0.029 | 0.029 | 0.190 | -0.140 |
| STC | 9 | 0.023 | 0.014 | -0.003 | 0.025 | 0.025 | -0.042 | 0.105 |

The Horizontal Direction of the ray : Θ
The Vertical Direction of the ray : Φ
The Projection Length of the ray ( r ) on the r Θ plane with the Direction Θ : r'

FIG. 26b

METHOD FOR COMBINING PHYSICAL OBJECTS USING POLAR COORDINATE STATISTICAL ANALYSIS

BACKGROUND OF THE INVENTION

1. Technical Field

The present invention relates to a manufacturing process control method, and more particularly to a method for combining physical objects and evaluating the combining process using Polar coordinate statistical analysis.

We live in an environment with a countless number of entities that can be described as variables in a two-dimensional or three dimensional coordinate system. Spatial orientation or color are a few examples of these variables. As we seek to learn more about these entities, it is important to understand how to define these entities in their coordinate system. Presently, a method to accurately and precisely assess the mean or difference between entities (from multiple measurements of the variables) in a way that can withstand the rigor of statistical examination is lacking. The importance of accuracy and precision has significant ramifications in any area of interest where the exactness of a measurement is a requirement.

With regard to spatial orientation, a quality control inspection in a manufacturing process would require an exact measurement. For instance, if two manufactured parts are being assembled, then exact measurements may be needed to assess where a first part is in relation to a second part. Generally, an accurate and precise method for positioning comparing and/or combining a physical entity with respect to another entity has numerous applications, including laser-welding of parts, precision measurements in dentistry, color matching in the paint industry, navigation, computer circuitry, microphotography, as well as spacial orientation of space crafts, projectiles and long-range telescopes.

Any exact measurement result relies on the multiple measurements which then can be analyzed through the correct statistical analysis method. At the present time, statistical analysis is being performed under the fundamental assumption of tan Θ=Θ that is generally applied in the calculation of the approximate length of a curved path in a plane, and thus the analysis of two-dimensional and three-dimensional data are presently using a linear statistical analysis method in the Cartesian coordinate system. The principal difference between the curved length calculation and the statistic analysis of a set of two-dimensional or three-dimensional data which includes a curved distribution, is that a curved path with a continuous value allows for using straight line segments (one can imagine as short as one please), such that each set of segments makes a polygonal path that fits the curve more tightly than before and by applying an integral the smooth enough "curve" is calculated. In contrast, if the data points are such that it is impossible to set straight line segments "as short as one please", then the fundamental assumption of the integral theory can not be applied in all statistical analysis. When the statistics for the tan Θ≠Θ data set are reported with the linear statistical analysis in the Cartesian coordinate system, tyhe reported values can only provide the approximate values. Reported values that are less than "true" will produce errors in any two- or three-dimensional spatial relationships that are being analyzed by the Cartesian approach. The magnitude of the error depends on the magnitude of the tan Θ-Θ difference per unit vector. The disadvantage in the Cartesian approach of analysis are directly related to accuracy and precision. As applied to the above-described quality control inspection application, reported values that are less than the true mean will produce errors in any two- or three-dimensional spacial relationships that are being analyzed by the Cartesian approach.

Therefore, it is desirable to provide a method for combining physical entities and evaluating the combining process using a Polar coordinate statistical analysis approach. By employing the method of the present invention, manufactured parts may be precisely assembled, an exact color match of paint can be created to match the paint of a scratched automobile, or the fit between an implant abutment and the prosthesis framework can be more accurately assessed. Regardless of the particular application, multiple measurements of variables used to describe each entity in a coordinate system are used to accurately and precisely assess the true mean. The Polar coordinate approach combines a linear statistical analysis method of the distance coordinate with a circular directional statistical analysis method on the angular coordinate(s), and thus is capable of computing the true mean values.

SUMMARY OF THE INVENTION

The present invention is a method for combining a first physical entity and a second physical entity. A first locating point is defined on a first entity, and a first location of the first locating point is determined by taking at least two measurements with respect to a Cartesian coordinate system. Similarly, a second locating point is defined on a second entity. After combining the first entity with the second entity, a second location of the second locating point is determined by taking at least two measurements. The Cartesian measurement data is transformed into vector data before mean values, including directional mean values, are generated by performing statistical analysis in a Polar coordinate system. The first location can then be analyzed with respect to the second location using these mean values. In another aspect of this invention, a method for positioning and analyzing a locating point on an entity in relation to a "target" first point located in a space using the Polar coordinate approach is provided.

BRIEF DESCRIPTION OF THE DRAWINGS

Additional advantages and features of the present invention will become apparent to those skilled in the art upon reading the following detailed description and upon reference to the drawings in which:

FIG. 5C is a table showing the mean values of points $P_1$ and $P_2$ in the different two-dimensional coordinate systems;

FIG. 6 is a table showing the statistical analysis of the directional data in the two-dimensional Polar coordinate system;

FIG. 8 is a table that summarizes the statistical analysis methods applicable to the two different two-dimensional coordinate systems;

FIG. 10 is a two-dimensional simulation model illustrating the statistical analysis differences between the two coordinate system methods;

FIG. 14 is a table showing the mean value of points $P_1$ and $P_2$ in the different three-dimensional coordinate systems;

FIG. 15 is a table showing the statistical analysis of the directional data in the three-dimensional Polar coordinate system;

FIG. 16 is a table that summarizes the statistical analysis methods applicable to the different three-dimensional coordinate systems;

FIG. 18 is a table of centroid and angular gap data points in the Cartesian coordinate system generated from measurements relating to the prosthesis framework;

FIG. 19 is a table of descriptive statistical data relating to the prosthesis framework generated using the Cartesian coordinate system approach;

FIG. 20 is a table of descriptive statistical data relating to the prosthesis framework generated using the Polar coordinate system approach of the present invention;

FIG. 21 is a table of the differences between the mean values generated using the Cartesian coordinate system approach and the Polar coordinate system approach;

FIGS. 23A and 23B are tables which list the three-dimensional x-, y- and z-axis measurement data in the Cartesian coordinate system and Polar coordinate system, respectively, for the location of the right centroid points for the welding condition cast;

FIGS. 24A and 24B are a tables which lists the means and standard deviations for the data as analyzed by the Cartesian coordinate system and the Polar coordinate system, respectively, for the locations for the right centroid points for the welding condition cast and welded bar;

FIG. 25 is a table which provides the P-value for the pairwise comparisons between the Cartesian coordinate system and the Polar coordinate system;

FIGS. 26A and 26B are tables which present the differences between the welded bars and welding condition model means as analyzed by the Cartesian coordinate system and the Polar coordinate system, respectively.

DETAILED DESCRIPTION OF THE PREFERRED EMBODIMENT

The following description of the preferred embodiment is merely exemplary in nature and is no way intended to limit the invention or its application or its uses. Moreover, the following description, while focusing on spatial orientation, it is intended to adequately teach one skilled in the art to apply the method for combining physical objects, using the Polar coordinate statistical analysis approach, to any type of variables that describe entities in a coordinate system.

Figure 1A:
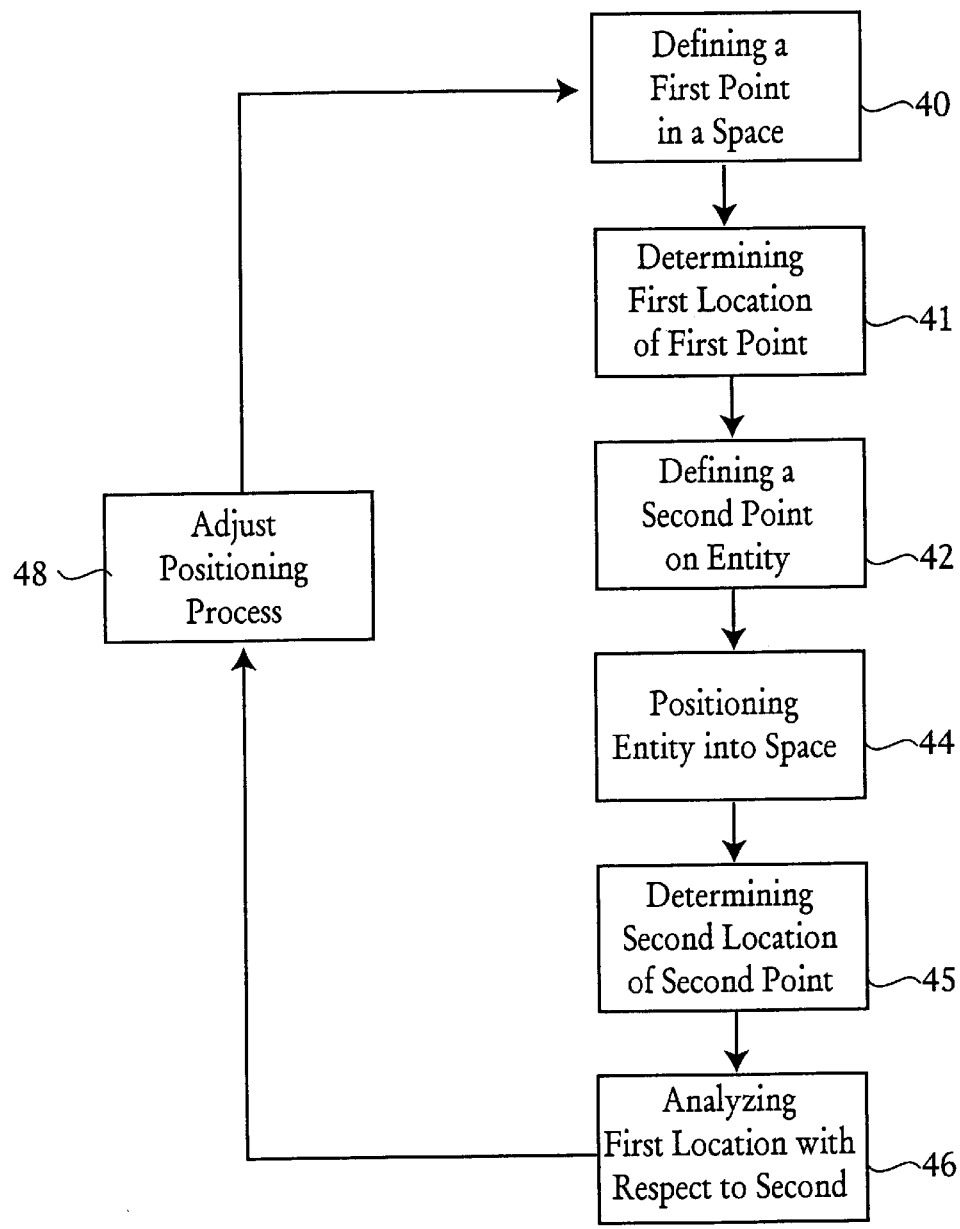
FIG. 1A is a block diagram showing the steps for analyzing a first locating point with respect to a second locating point in accordance with the method of the present invention.

A method for positioning a physical entity into a space is illustrated in FIG. 1A. First, a first locating point is defined 40 and a first location of the first locating point is determined 41 by taking at least two measurements of the first point with respect to a coordinate system. Next, a second locating point is defined 42 on an entity, and then the entity is positioned 44 into the coordinate system. A second location of the second locating point is determined 45 by taking at least two measurements of the second locating point. Statistical analysis is performed 46 on each of the location measurements in a second coordinate system, having at least one directional or angular coordinate, to generate mean values. For instance, the Polar coordinate approach (further discussed below) may be applied to vector data in a two-dimensional Polar coordinate system which includes a distance coordinate (r) and a directional or angular coordinate ($\Theta$). The first locating point serves as a target or baseline measurement that is trying to be achieved by the positioning process. To improve the accuracy and precision of the positioning, the positioning process can be adjusted 48 based upon the generated mean values. Thus, a first aspect of the present invention provides a method for more accurately and precisely positioning a physical entity into a space. As will be apparent to one skilled in the art, the above described method can also be used to compare and/or combine a first entity to a second entity.

Figure 1B:
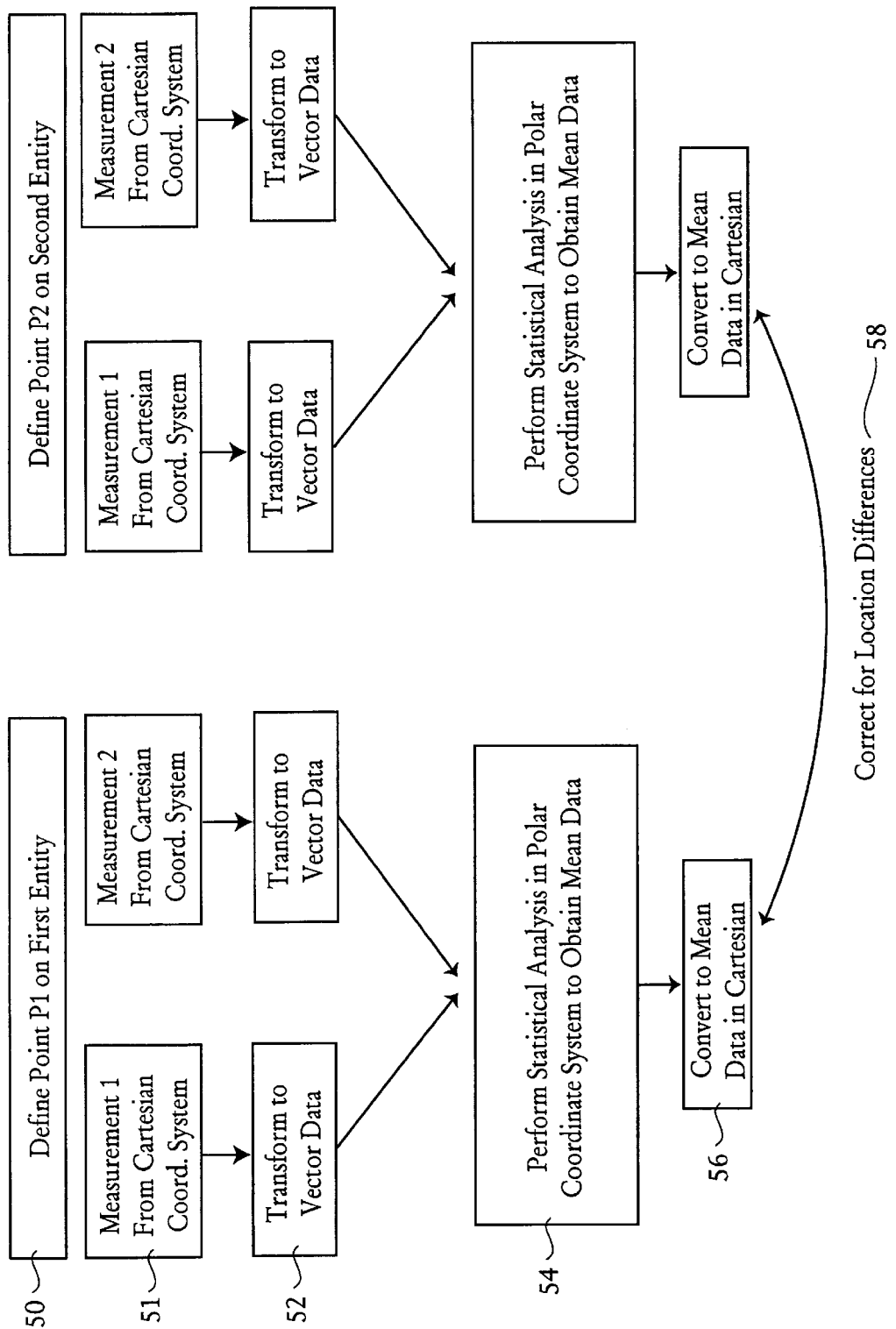
FIG. 1B is a block diagram showing the steps for comparing a first locating point on a first entity with a second locating point on a second entity in accordance with the method of the present invention.

A more detailed method for comparing a first physical entity and a second physical entity is illustrated in FIG. 1B. First, a first locating point is defined 50 on a first entity, and a first location of the first locating point is determined 51 by taking at least two measurements with respect to a Cartesian coordinate system. The Cartesian coordinate x, y, and z data for the two measurements are then transformed 52 to vector data (xyz-vector length, and its vertical and horizontal direction). The analysis of the measurement data obtained from the Cartesian coordinate system is performed 54 in the Polar coordinate system using the vector data. The Polar coordinate statistical analysis approach is used to determine the mean of ray length, and its vertical and horizontal directions, and then the three Polar coordinate data (ray length, vertical and horizontal directional data) are converted 56 to mean Cartesian coordinate data (x1m, y1m, and z1m). Next, a second locating point is defined on a second entity, and the second entity is positioned into the Cartesian coordinate system. Similarly, a second location of the second locating point is determined by taking at least two measurements of the second locating point. The transformation of the Cartesian coordinate data and the analysis of the data by the Polar coordinate method are repeated with the second locating point to obtain the second point mean Cartesian coordinate data (x2m, y2m, and z2m).

Assuming that first locating point is oriented in the coordinate space in the "true" location, then comparing 58 the second locating point data to the first locating point data will provide information on the differences or corrections necessary to locate the second point at the true location in the coordinate space. This correction procedure not possible using only the Cartesian coordinate system because it cannot locate the "true" position of either locating point in the coordinate space. As will be apparent to one skilled in the art, the detailed steps discussed in conjunction with comparing two entities are also applicable when performing the positioning method of FIG. 1A. It is also envisioned that this method of the present invention can be used to analyze the fit between two or more entities that have been combined.

Figure 2A:
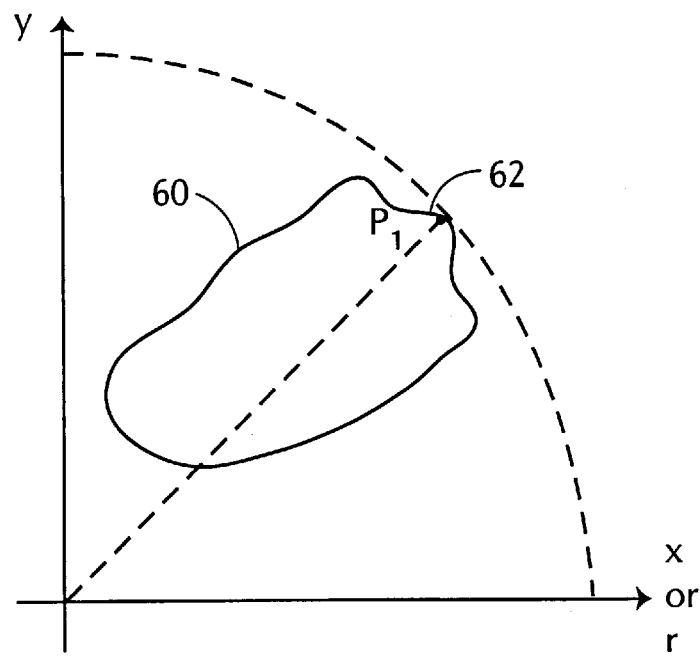
FIG. 2A is a diagram showing the first locating point ($P_1$) on a first entity in relation to a two-dimensional (sharing) coordinate system.
Figure 2B:
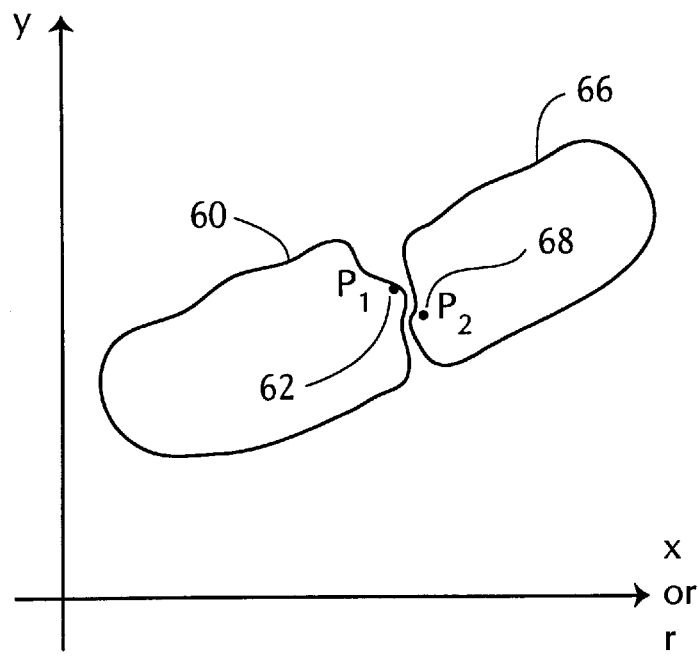
FIG. 2B is a diagram showing the first locating point with respect to a second locating point ($P_2$) on a second entity that is being combined with the first entity.

A two-dimensional representation of this combining process is shown in FIGS. 2A and 2B. In FIG. 2A, a first entity 60 having a first locating point 62 is defined in a coordinate system. A first entity 60 and a second entity (not shown), having a second locating point, are to be combined, such that a first locating point is accurately and precisely aligned with the second locating point. In FIG. 2B, the second entity 66 is combined with first entity 60, however the second locating point 68 of second entity 66 is not exactly in alignment with first locating point 62. By the Polar coordinate statistical analysis approach, the fit between the two entities (i.e., between the first locating point and second locating point) can be better analyzed. Thus, in a another aspect of the present invention, an accurate and precise method for combining a first entity and a second entity is provided.

Performing statistical analysis in the Polar coordinate system is one step in the method of the present invention. However, in order to understand the advantages of the present invention, The Polar coordinate approach will be discussed in detail and will be contrasted with the traditional Cartesian approach.

Analyzing spacial orientation will serve as the basis for this discussion. The selection of a particular coordinate system to evaluate spatial relationships begins with defining the dimensions of the space in which the entity of interest is being measured. Coordinates systems in use for spatial evaluations include Cartesian, Polar, Spherical, etc. Whether the space is two-dimensional or three-dimensional will influence the selection of the coordinate system. Although the Cartesian coordinate system involves measurements in both two- and three-dimensions, the traditional Polar system is limited to measurements that are only two-dimensional and the Spherical system is used for measurements that involve three-dimensions. Thus, to simplify this discussion, the phrase "Polar coordinate" system will be used to describe both of these traditional systems when compared to the Cartesian system. The discussion will begin by addressing two-dimensional relationships because it will provide the foundation for understanding the application of the Polar coordinate approach to three-dimensional data. In order to understand the differences between these coordinate systems, the discussion begins with a clarification of related terms and definitions so that comparisons can be made between the two coordinate systems.

1. The vertical direction $\Phi$ in the new three-dimensional Polar coordinate system originates from the initial ray instead of originating from the positive z-axis as traditionally defined. In so doing, it becomes more convenient to compare the two different coordinate systems as $\Phi = \phi$ (the vertical angle of a vector in the Cartesian coordinate system originating from the positive x-axis). One must recognize that there is no z-axis in the Polar coordinate system.
2. Any angle discussed will be limited within 0 radian<Angle$\leq 2\pi$radian Any angle magnitude exceeding this limitation will be first converted within this limitation before proceeding.
3. The magnitude of the linear coordinate (the distance) r in the traditional Spherical coordinate system is always positive $r \geq 0$, however, this dose not apply for the traditional Polar coordinate system (two-dimensional). In this discussion, all linear magnitudes r of the new Polar coordinate system are considered positive $r \geq 0$ even in the two-dimensional coordinate system. The "negative" r will be represented by its direction (angle).
4. Accepting that points 3 and 4 are correct, then each unique point in both the Polar and the Cartesian coordinate systems represents one pair of coordinates.

In a two-dimensional Cartesian coordinate system, the horizontal line (x-axis) and the vertical line (y-axis) crosses at the origin $P_0$ and forms a rectangle. The right side of $P_0$ on the x-axis and the upper side of $P_0$ on y-axis represents a positive number that will increase in magnitude as the distance from $P_0$ increases. The left side of $P_0$ on the x-axis and the lower side of $P_0$ on the y-axis represents the negative number that will decrease in magnitude as the distance from $P_0$ increases. The x-coordinate and the y-coordinate together form the square xy-plane and all points Pn lie on the xy-plane.

On the other hand, in a two-dimensional Polar coordinate system, the initial ray extends from the origin $P_0$ horizontally (to the right). The initial ray (r) represents two different coordinates. The first is the distance coordinate, while the second is the direction coordinate, and both together form a pair of coordinates in the Polar coordinate system. The distance from $P_0$ on the initial ray represents the linear magnitude of the distance r, which is positive ($r \geq 0$). There is no negative r-value. The direction (angle $\Theta$) originates from the initial ray and any increase in its magnitude occurs in the counter-clockwise direction. The distance coordinate and the direction coordinate together form the circular r$\Theta$-plane and all point represented by Pn lie on the r$\Theta$-plane.

Figure 3:
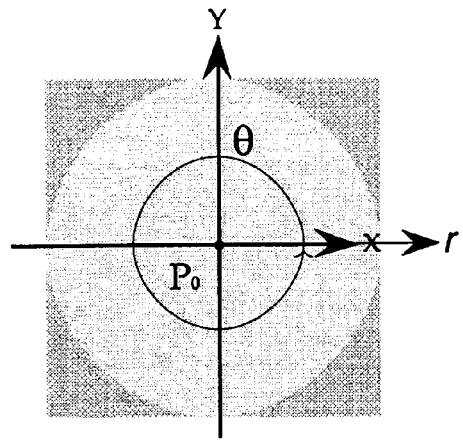
FIG. 3 is a diagram showing a two-dimensional sharing system of a Cartesian coordinate system and a Polar coordinate system.

The relationship between the Cartesian and the Polar coordinate systems when they have the common origin $P_0$ are illustrated in FIG. 3. It should be noted that in this two coordinate systems sharing system which will be called "the sharing (coordinate) system" or "the two-dimensional sharing (coordinate) system" from here forward, the initial ray of the Polar coordinate system coincides with the positive side x-axis of the Cartesian coordinate system. The xy-plane and the r$\Theta$-plane lie on the same plane, however, their shapes are different.

Figure 4:
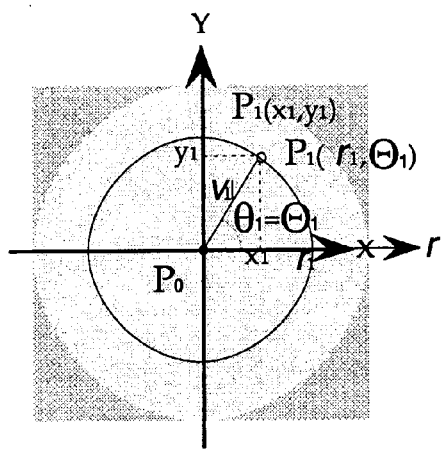
FIG. 4 is a diagram showing a point $P_1$ in a two-dimensional sharing system.

As best seen in FIG. 4, $P_1$ demonstrates a point in a two-dimensional sharing system. Point $P_1$ in the Cartesian coordinate system with the coordinate pair of x1 and y1 is expressed as P1(x1, y1) and demonstrates that the values of x1 and y1 are the scales projected rectilinearly from P1 against the x-, and y-coordinates, respectively. $P_1$ in this Cartesian coordinate system can also be expressed as the terminal point of the vector $\overrightarrow{P_0P_1}(v_1)$ whose initial point is $P_0$. The directed distance $v_1$ represents the magnitude of the line segment $P0P1 = |v_1|$ and the direction (angle) of $\theta_1$ which was initiated from the positive x-axis and increases its scale in the counter-clockwise direction.

The following relationships exist between the x-, y-coordinate values and the vector values:

$$|v_1| = \sqrt{x_1^2 + y_1^2}$$

$$\theta_1 = \tan^{-1}\left(\frac{y_1}{x_1}\right)$$

In the Polar coordinate system, $P_1$ is located at the cross point of a circumference of a circle and a line. The circumference of a circle centered at $P_0$ with the radius $r_1$ is generated from the distance coordinate and represents the linear magnitude of the distance. This line originating from $P_0$ and elevated by the tan $\Theta_1$ is generated by the direction coordinate.

$P_1$ with the Polar coordinate pair $r_1$ and $\Theta_1$ is expressed as $P_1(r_1, \Theta_1)$. Unlike the values of a pair of coordinates in the rectangular Cartesian coordinate system which represent the projection scales from $P_1$ onto the respective coordinate, the values of $r_1$ and $\Theta_1$ themselves represent the distance and direction coordinates, respectively. The distance coordinate which represents the linear magnitude in the Polar coordinate system functions as the radius of a circumference of a circle so that the $r_1$ value of $P_1$ is not the rectilinear projection scale on the distance coordinate but is the circular trace scale from $P_1$ to the distance coordinate.

The sharing coordinate system shows that;
1. The magnitude of the distance coordinate $r_1$ in the Polar coordinate system coincides with the vector magnitude $|v_1|$ in the Cartesian coordinate system.
2. The direction coordinate value $\Theta_1$ of the Polar coordinate system coincides with the vector direction $\theta_1$ of the Cartesian coordinate system.

Based on relationships of the coordinates of a point between two coordinate systems, it is possible to convert a point directly from one coordinate system into the other system.

To perform a statistical analysis involving measurement data, it is necessary to have more than one data point, with two (2) points being the minimum data number to satisfy the "more than one (1)" requirement. A major step in the analysis is to generate the arithmetic mean in order to depict the central tendency of a set of data. The arithmetic mean(or the average) of any real number will be generated by dividing the sum of recorded values by the number of values measured.

The formula is;

$$a_m = \frac{\sum_{n=1}^{i} a_n}{i}$$

In the formula $a_m$ is the arithmetic mean (the average) of a set of real numbers $a_n$ (n=1 . . . i).

Figure 5A:
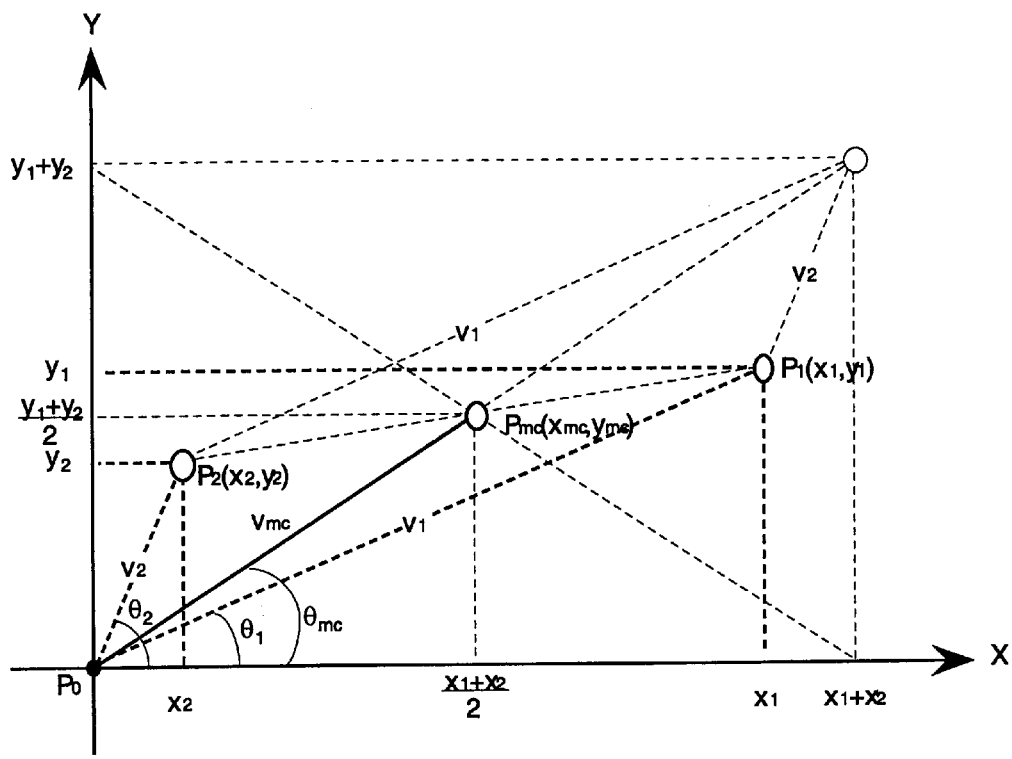
FIG. 5A is a diagram showing the mean value $P_{mc}$ of points $P_1$ and $P_2$ in a two-dimensional Cartesian coordinate system.
Figure 5B:
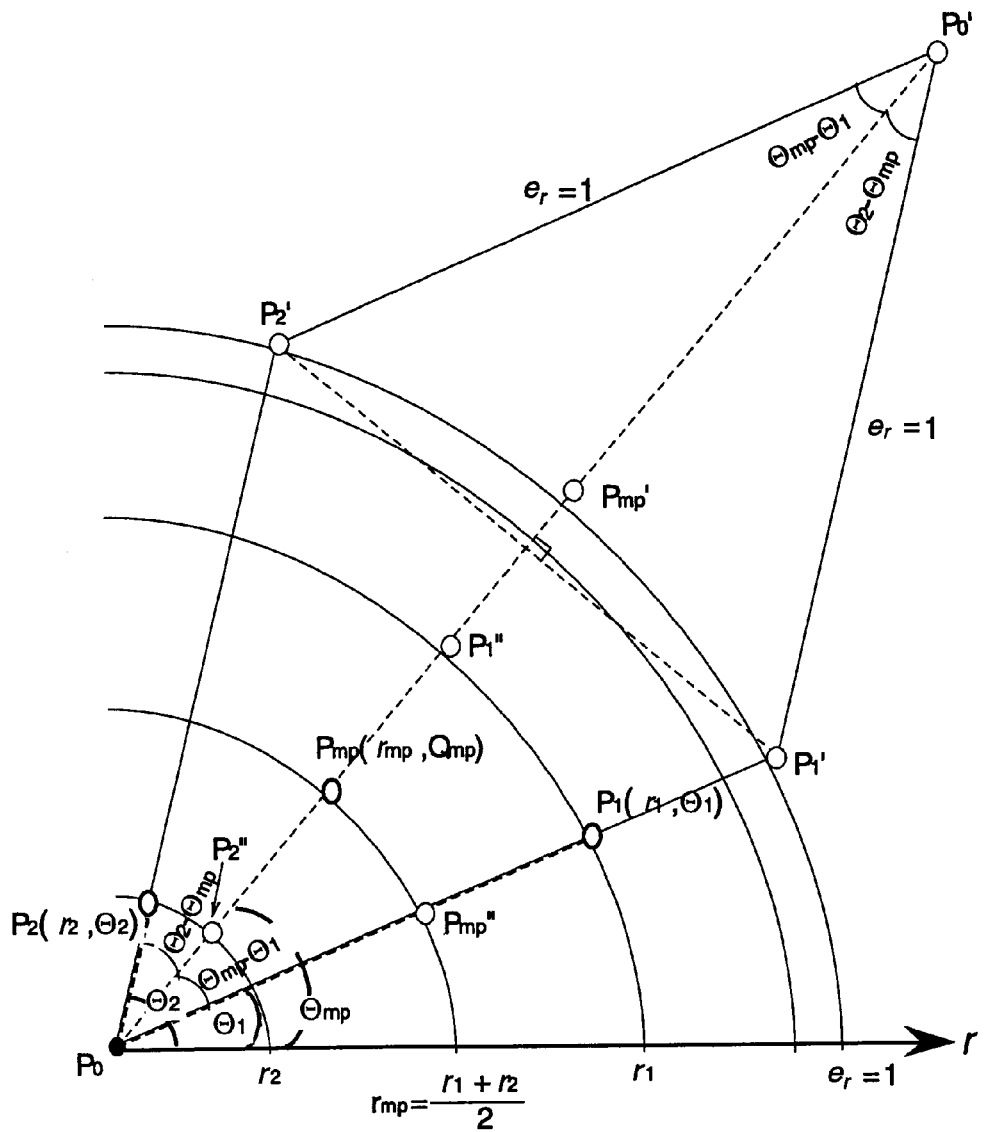
FIG. 5B is a diagram showing a mean value $P_{mp}$ of points $P_1$ and $P_2$ in a two-dimensional Polar coordinate system.

$P_1$ and $P_2$ have been chosen to represent two points in the Cartesian and the Polar coordinate systems as illustrated in FIGS. 5A and 5B. In FIG. 5A, Pmc represents the mean point of $P_1$ and P2 in the Cartesian coordinate system, while in FIG. 5B, $P_{mp}$ is the mean point of $P_1$ and P2 in the Polar coordinate system. In FIG. 5A, $P_1(x1, y1)$, $P_2(x2, y2)$ and $P_{mc}(xmc, ymc)$ are the points of interest in the Cartesian coordinate system. $P_{mc}$ has the coordinate pair of xmc and ymc which will be calculated from the formula as:

The mean of x-coordinate $$x_{mc} = \frac{(x_1 + x_2)}{2},$$

The mean of y-coordinate $$y_{mc} = \frac{(y_1 + y_2)}{2}.$$

The vector magnitude of $$\overrightarrow{P_0P_{mc}} \text{ is } |v_{mc}| = \sqrt{x_{mc}^2 + y_{mc}^2}$$

therefore $$|v_{mc}| = \frac{1}{2}\sqrt{(x_1 + x_2)^2 + (y_1 + y_2)^2},$$

its direction is $$\theta_{mc} = \tan^{-1}\left(\frac{y_{mc}}{x_{mc}}\right)$$

therefore:

$$\theta_{mc} = \tan^{-1}\left(\frac{\frac{y_1 + y_2}{2}}{\frac{x_1 + x_2}{2}}\right) = \tan^{-1}\left(\frac{y_1 + y_2}{x_1 + x_2}\right).$$

This is proved by the vector theorem and the vector scale multiplication theorem:

1. The vectors of $P_1$ and $P_2(\overrightarrow{P_0P_1}, \overrightarrow{P_0P_2})$ are v1 and v2 respectively.

The sum of v1 and v2 is the vector obtained by adding corresponding coordinates:

(v1+v2)=(x1+x2, y1+y2),
  note; the x-coordinate=x1+x2,
    the y-coordinate=y1+y2,
therefore,
  the magnitude of (v1+v2) is:

$$|v_1 + v_2| = \sqrt{(x_1 + x_2)^2 + (y_1 + y_2)^2},$$

the direction of (v1+v2) is:

$$\tan^{-1}\left(\frac{y_1 + y_2}{x_1 + x_2}\right).$$

2. The vector (v1+v2) multiplied by ½ to get the mean of (v1+v2) which is $\overrightarrow{P_0P_{mc}}$, the magnitude of $\overrightarrow{P_0P_{mc}}$ is $$\frac{1}{2} \cdot |v_1 + v_2| = \frac{1}{2}\sqrt{(x_1+x_2)^2 + (x_1+x_2)^2},$$

the direction of $\overrightarrow{P_0P_{mc}}$ is the same as the direction of the (v1+v2).

The direction of $\overrightarrow{P_0P_{mc}}$=the direction of (v1+v2)=

$$\tan^{-1}\left(\frac{y_1+y_2}{x_1+x_2}\right).$$

The relationship between $P_{mc}$ and the line segment P1P2 is further examined as:

1. $\overrightarrow{P_1P_2}$=v1−v2, the magnitude is $$|v_1 - v_2| = \sqrt{(x_1-x_2)^2 + (x_1-x_2)^2},$$

the direction is $$\tan^{-1}\left(\frac{y_1-y_2}{x_1-x_2}\right).$$

2. $\overrightarrow{P_1P_{mc}}$=v1−vmc, the magnitude is $$|v_1 - v_{mc}| = \sqrt{\left(x_1 - \frac{x_1-x_2}{2}\right)^2 + \left(y_1 - \frac{y_1-y_2}{2}\right)^2},$$

$$= \sqrt{\left(\frac{x_1-x_2}{2}\right)^2 + \left(\frac{y_1-y_2}{2}\right)^2},$$

$$= \frac{1}{2}\sqrt{(x_1-x_2)^2 + (y_1-y_2)^2},$$

the direction is:

$$\tan^{-1}\left(\frac{y_1-y_2}{x_1-x_2}\right).$$

3. $\overrightarrow{P_{mc}P_2}$=vmc−v2, the magnitude is $$|v_{mc} - v_2| = \sqrt{\left(\frac{x_1-x_2}{2} - x_2\right)^2 + \left(\frac{y_1-y_2}{2} - y_2\right)^2},$$

$$= \sqrt{\left(\frac{x_1-x_2}{2}\right)^2 + \left(\frac{y_1-y_2}{2}\right)^2},$$

$$= \frac{1}{2}\sqrt{(x_1-x_2)^2 + (y_1-y_2)^2},$$

the direction is:

$$\tan^{-1}\left(\frac{y_1-y_2}{x_1-x_2}\right).$$

Thus the mean point $P_{mc}$ of $P_1$ and P2 is located at the midpoint of the line segment $P_1P_2$, that is to say $P_{mc}$ is locating at the center of $P_1$ and $P_2$ which present a linear distribution. Therefore, it can be concluded that:

1. In the Cartesian coordinate system, the analysis by either the coordinate (axes) or the vector analysis, will produce identical results of the mean Pmc of $P_1$ and $P_2$ $\overrightarrow{P_0P_{mc}}$ is the mean of $\overrightarrow{P_0P_1}$ and $\overrightarrow{P_0P_2}$. Pmc is the midpoint of the line segment $P_1P_2$. The statistical analysis in the Cartesian coordinate system is suitable for a data set which presents a linear distribution. The reciprocal transformation $P_{mc}$ data between the coordinate data and the vector data are certified.

2. Although the identical $P_{mc}$ is generated both by the coordinate analysis and the vector analysis, the actual vector addition process in the vector analysis requires that the vector first be decomposed into each of its coordinates (components). The summation then can proceed with the addition of each corresponding coordinate (component). The sum of the vectors in magnitude and direction is the composed data from the sum of decomposed coordinates (components), thereby limiting statistical analysis on the vector value. All statistical analysis in the Cartesian coordinate system will only be performed on each x-, y-coordinate (component) by the linear statistical analysis method.

FIG. 5B illustrates two points $P_1(r_1, \Theta_1)$, $P2(r_2, \Theta_2)$ and the mean point $P_{mp}(r_{mp}, \Theta_{mp})$ in the Polar coordinate system. The coordinates of $P_{mp}$ are calculated according to the arithmetic mean formula:

the mean of the distance coordinate is $$r_{mp} = \frac{r_1 + r_2}{2},$$

the mean of the direction coordinate is $$\Theta_{mp} = \frac{\Theta_1 + \Theta_2}{2}.$$

Pmp is located at the cross point of a circular circumference centered at P0 with its radius $$r_{mp} = \frac{r_1 + r_2}{2}$$

and a line originating from $P_0$ and elevated by the $$\tan\Theta_{mp} = \left(\frac{\Theta_1 + \Theta_2}{2}\right).$$

FIG. 5B also demonstrates the way to find the mean coordinate $\Theta_{mp}$ from $\Theta_1$ and $\Theta_2$ geometrically. A circular circumference is centered at P0 with the radius=1, and two lines P0P1 and P0P2 are extended until they cross at points $P_1'$, $P_2'$ located within this circular circumference. Drawing two lines from $P_1'$ and P2' and finding their cross point $P_0'$, create the line P1'P0' parallels to P0P2' and the line P2'P0' parallel to P0P0'. The two diagonals P0P0' and P1'P2' of the equilateral square P0P1'P0'P2' are crossing each other perpendicularly so that the angle P1'P0P0' equals the angle P2'P0P0'.

If the direction of Point P0' is $\Theta_{mp}$, $$\Theta_{mp} - \Theta_1 = \Theta_2 - \Theta_{mp},$$

-continued $$\Theta_{mp} = \frac{\Theta_1 + \Theta_2}{2}.$$

The direction of $P_0'=\Theta_{mp}$ is the arithmetic mean of $\Theta_1$ and $\Theta_2$.

In this way, a circumference of a circle centered at the origin and the radius=1 serves as the unit distance coordinate (the unit ray magnitude=$e_r$).

$$r = 0 \text{ and } m = \frac{1}{r} \text{ then } e_r = \frac{1}{r} r e_r = 1.$$

The category of the unit ray magnitude ($e_r$) is introduced here in the new Polar coordinate system which is the equivalence of the unit vector ($e_v$) of the vector analysis in the Cartesian coordinate system in order to normalize the direction of each point and calculate the mean direction of those points. $P_1'$, $P_2'$, Pmp' are unit rays of the points $P_1$, $P_2$, Pmp respectively whose distance coordinate magnitude r are always 1, but whose direction coordinate $\Theta$ are the same as $\Theta_1$, $\Theta_2$ and $\Theta_{mp}$ respectively.

$$e_{rmp} = \frac{1}{i}\sum_{n=1}^{i} e_m = 1, \text{ here } e_r = \sqrt{(\cos\Theta)^2 + (\sin\Theta)^2} = 1.$$

If the horizontal component $\cos\Theta$ and the vertical component $\sin\Theta$ of the angle $\Theta$ are named $\hat{x}$ and $\hat{y}$ respectively, their means $\hat{x}(=x_{\hat{mp}})$ and $\hat{y}(=y_{\hat{mp}})$ will be $$\hat{x}_{mp} = \frac{1}{i}\sum_{n=1}^{i} \cos\Theta_n,$$

$$\hat{y}_{mp} = \frac{1}{i}\sum_{n=1}^{i} \cos\Theta_n,$$

so that the mean of the direction coordinate $\Theta_{mp}$ is $$\Theta_{mp} = \frac{1}{i}\sum_{n=1}^{i} \Theta_n = \tan^{-1}\frac{\hat{y}_{mp}}{\hat{x}_{mp}} = \tan^{-1}\frac{\sum_{n=1}^{i}\sin\Theta_n}{\sum_{n=1}^{i}\cos\Theta_n}.$$

The circular standard deviation of $\Theta_{mp}$ is $$\sqrt{-2\log_e(R_{mp})},$$

here the mean resultant length $R_{mp}$ is $$R_{mp} = \sqrt{\hat{x}_{mp}^2 + \hat{y}_{mp}^2} = \frac{1}{i}\sqrt{\left(\sum_{n=1}^{i}\cos\Theta_n\right)^2 + \left(\sum_{n=1}^{i}\sin\Theta_n\right)^2}.$$

FIG. 6 summarizes the descriptive statistic analysis method of the directional data in the two-dimensional Polar coordinate system. For more detail on the comparison statistic analysis method, one will be referred to K. V. Mardia, Statistics of Directional Data, 1972 Academic Press, London and New York.

On the basis of the theorem Arc=Radius×Angle (in radian), if the cross points of the line P0P0' and the arcs $\hat{r}_1$ and $\hat{r}_2$ are $P_1''$ and $P_2''$ respectively, the cross point line $P0P_1$ and the arc $\hat{r}_{mp}$ is $P_{mp}''$ (see FIG. 3.2), then The arc $\widehat{P_1P_1''}$ with the radius $r_1$ and the angle $\Theta_{mp}$, the magnitude $\widehat{P_1P_1''} = r_1 \times \Theta_{mp}$, The arc $\widehat{P_2P_2''}$ with the radius $r_1$ and the angle $\Theta_{mp}$, the magnitude $\widehat{P_2P_2''} = r_2 \times \Theta_{mp}$, The arc $\widehat{P_{mp}P_{mp}''}$ with the radius $r_{mp}$ and the angle $\Theta_{mp}$, the magnitude $\widehat{P_{mp}P_{mp}''} \; r_{mp} \times \Theta_{mp}$, $$\therefore \widehat{P_{mp}P_{mp}''} = \left(\frac{r_1+r_2}{2}\right)\times\Theta_{mp} = \frac{1}{2}\left(\widehat{P_1P_1''} + \widehat{P_2P_2''}\right)$$

Here if $P_1$ and $P_2$ are located on a circular circumference (radius=r), then $P_{mp}$ is also located at the same circumference of $\frac{1}{2}(r_1+r_2)=r$, and $\widehat{P_1P_{mp}''}=\widehat{P_{mp}P_2''}$. It is proved that the mean point $P_{mp}$ of $P_1$ and P2 is the midpoint of the circumference segment of $\widehat{P_1P_2}$ if $r_1=r_2$. Thus it becomes obvious that $P_{mc}$ is locating at the center of $P_1$ and $P_2$ that present a circular distribution directionally and a linear distribution along the distance coordinate. The statistical analysis in the Polar coordinate system is suitable for a data set which present a combination of a circular distribution and a linear distribution.

Figure 7:
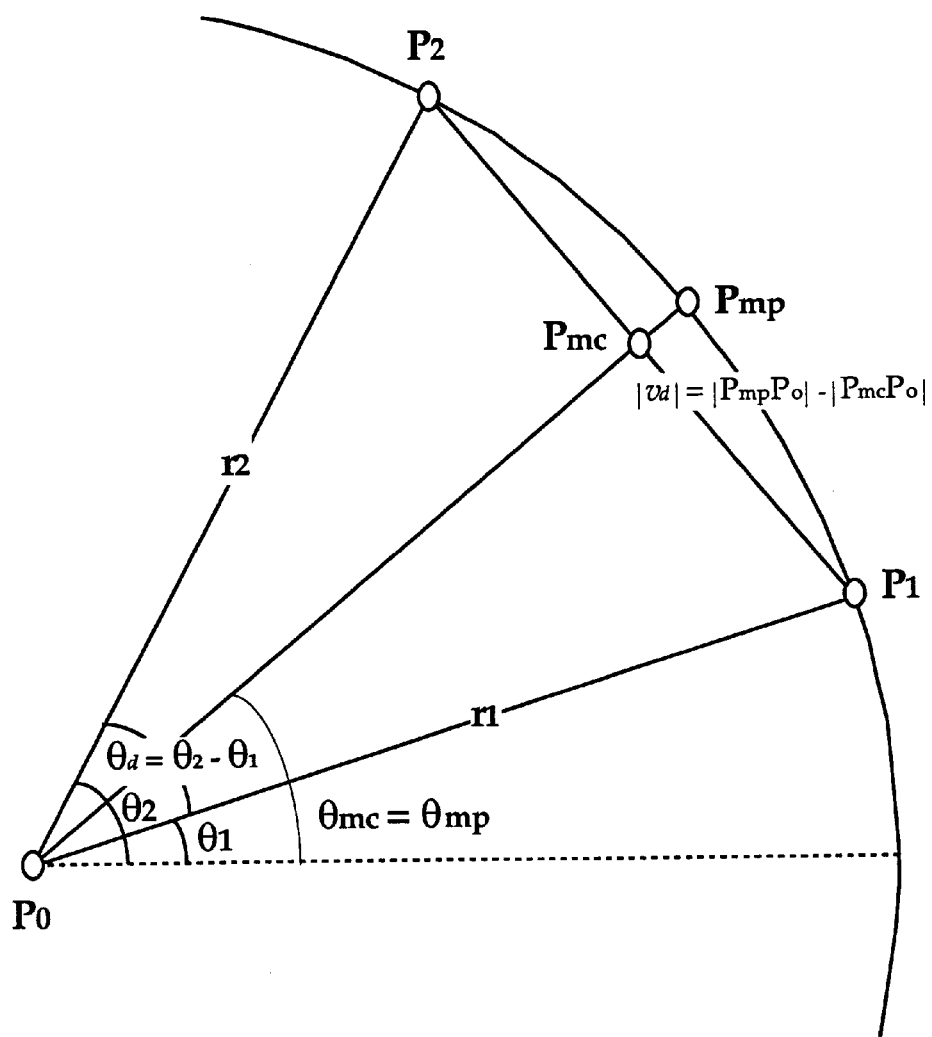
FIG. 7 is a diagram showing a two-dimensional relationship of $P_{mc}$ and $P_{mp}$ when $r_1$ equals $r_2$.

This relationship of $P_{mc}$ and $P_{mp}$ of $P_1$ and P2 is shown in FIG. 7. $P_{mc}$ always is the midpoint of the line segment $P_1P_2$, whereas Pmp is the midpoint of the circumference segment $\widehat{P_1P_2}$ when the distance P1P0(r1)=P2P0(r2).

The mean x-,y-coordinate values of Pmp in the Cartesian coordinate system will be decomposed from the r and $\Theta$ mean coordinate values of the Polar coordinate system. A statistical analysis can not be perform on those decomposed data. In contrary with the Cartesian coordinate system, a statistical analysis can only be performed on the r and $\Theta$ coordinate data in the Polar coordinate system. It is, therefore, concluded that for:

1. the distance coordinate (the linear magnitude, r), the linear statistical analysis method will be applied, 2. the direction coordinate (the angular magnitude $\Theta$), the two-dimensional circular directional data statistical analysis method will be applied.

Thus, this new Polar coordinate system statistical analysis method which combines the linear statistical analysis method of the distance coordinate data and the directional data statistical analysis method of the direction coordinate(s) data.

FIG. 8 summarizes the statistical analysis methods used in the different two-dimensional coordinate system.

Figure 9:
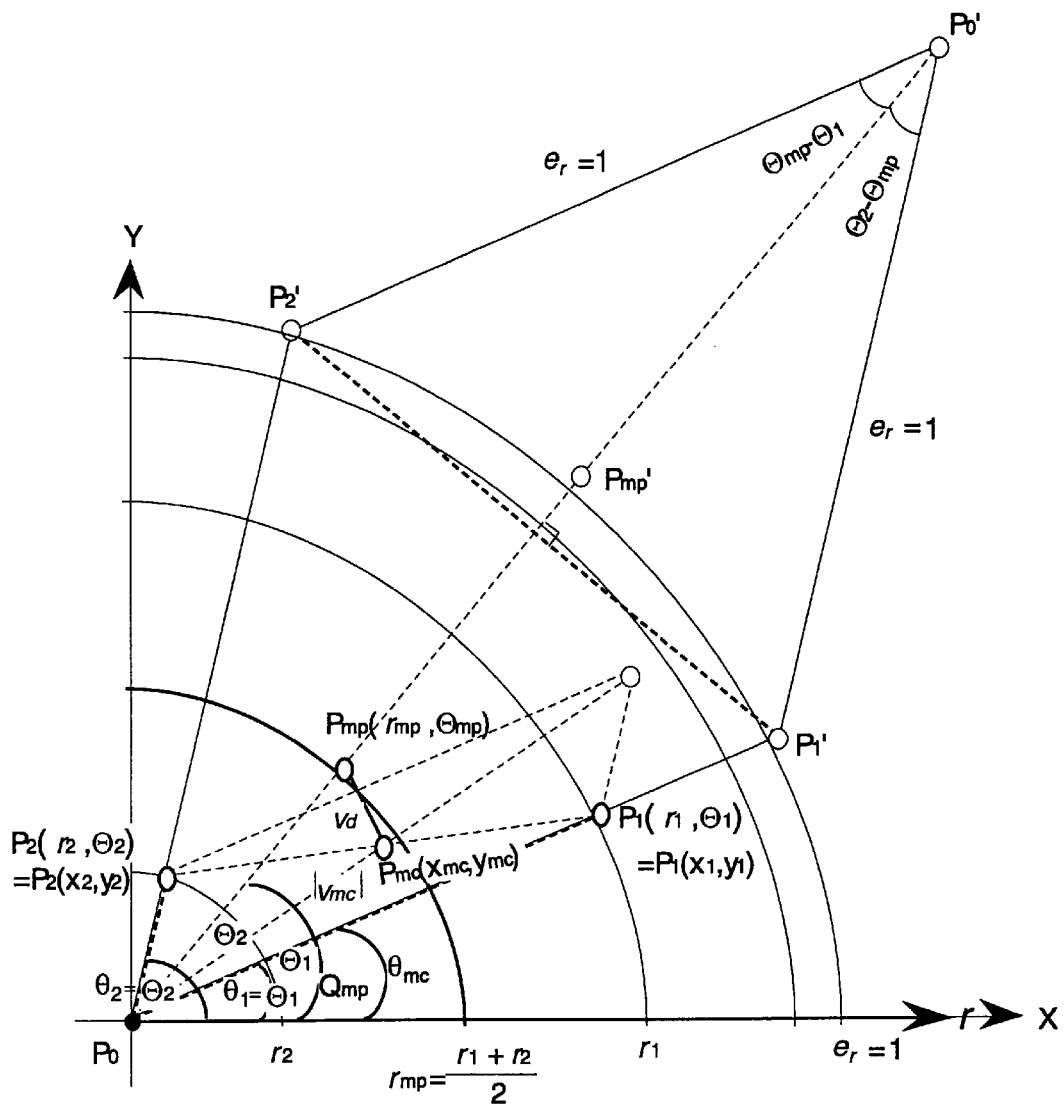
FIG. 9 is a diagram showing the mean values $P_{mc}$ and $P_{mp}$ of points $P_1$ and $P_2$ in a two-dimensional sharing system.

FIG. 9 shows two points $P_1$, $P_2$ in the two-dimensional sharing system. As described earlier it is possible to reciprocally convert a point directly from one coordinate system into the other. Regarding to this converting method it is examined if $P_{mc}(x_{mc},y_{mc})=P_{mp}(r_{mp},\Theta_{mp})$ Here, the vector vmc for Pmc(xmc, ymc) has the magnitude $|v_{mc}|$ and the direction $\theta_{mc}$.

1. The linear magnitudes of Pmc and Pmp;

$$r_1 = |v_1|, r_2 = |v_2|,$$

$$r_{mp} = \frac{r_1+r_2}{2} = \frac{|v_1|+|v_2|}{2} = |v_{mp}|,$$

-continued $$v_{mc} = \frac{v_1 + v_2}{2},$$

$$|v_{mc}| = \frac{v_1 + v_2}{2} \le \frac{|v_1| + |v_2|}{2}$$

(Triangle Inequality of Vectors–Minkowski's inequality)

$$\therefore |v_{mc}| \le |v_{mp}| = r_{mp},$$

the equal sign holds when P0, $P_1$, $P_2$ are collinear.

2. The directions of Pmc and Pmp;

$$\Theta_{mp} = \frac{\theta_1 + \theta_2}{2} = \frac{\tan^{-1}\left(\frac{y_1}{x_1}\right) + \tan^{-1}\left(\frac{y_2}{x_2}\right)}{2},$$

$$\theta_{mc} = \tan^{-1}\left(\frac{y_{mc}}{x_{mc}}\right) = \tan^{-1}\left(\frac{\frac{y_1 + y_2}{2}}{\frac{x_1 + x_2}{2}}\right) = \tan^{-1}\left(\frac{y_1 + y_2}{x_1 + x_2}\right),$$

$$\therefore \Theta_{mp} \ne \theta_{mc}, \text{ unless } \tan^{-1}\left(\frac{y_1}{x_1}\right) = \tan^{-1}\left(\frac{y_2}{x_2}\right) = \tan^{-1}\left(\frac{y_1 + y_2}{x_1 + x_2}\right),$$

that is P0, $P_1$, $P_2$ are collinear and $P_1$, $P_2$ are within the same quadrant.

From the above comparison, it is clear that the mean point $P_{mc}$ generated in the Cartesian coordinate system and the mean point $P_{mp}$ generated in the Polar coordinate system are unique from each other and the distance magnitude of $P_{mp}$ ($r_{mp}$) is always greater than the directed distance magnitude of Pmc($|v_{mc}|$) except when $P_1$ and $P_2$ are within the same quadrant and $P_0$, $P_1$, $P_2$ are collinear.

The xmp and ymp are x-, y-coordinate pairs of Pmp in the Cartesian coordinate system.

Because:

$$|v_{mp}| = r_{mp} = \frac{|v_1| + |v_2|}{2} = \frac{1}{2}\left(\sqrt{x_1^2 + y_1^2} + \sqrt{x_2^2 + y_2^2}\right),$$

$$x_{mp} = |v_{mp}|\cos(\Theta_{mp}) = \frac{1}{2}\left(\sqrt{x_1^2 + y_1^2} + \sqrt{x_2^2 + y_2^2}\right)\cos\left(\frac{\theta_1 + \theta_2}{2}\right),$$

$$y_{mp} = |v_{mp}|\sin(\Theta_{mp}) = \frac{1}{2}\left(\sqrt{x_1^2 + y_1^2} + \sqrt{x_2^2 + y_2^2}\right)\sin\left(\frac{\theta_1 + \theta_2}{2}\right).$$

The difference between rpm and vmc is the difference between vmp and vmc.

With the vector analysis–vector subtraction theorem; ti $v_d = v_{mp} - v_{mc} = v_{mp} + (-v_{mc})$, The vector $\overrightarrow{P_{mp}P_{mc}}(v_d)$; is, the magnitude $$|v_d| = v_{mp} - v_{mc} = \sqrt{(x_{mp} - x_{mc})^2 + (y_{mp} - y_{mc})^2},$$

the direction $$\theta_d = \tan^{-1}\left(\frac{y_{mp} - y_{mc}}{x_{mp} - x_{mc}}\right).$$

The x-coordinate difference of $P_{mp}$ and $P_{mc}$ is, $$x_d = \sqrt{(x_{mp} - x_{mc})^2 + (y_{mp} - y_{mc})^2} \cos\left(\tan^{-1}\left(\frac{y_{mp} - y_{mc}}{x_{mp} - x_{mc}}\right)\right),$$

The y-coordinate difference of $P_{mp}$ and $P_{mc}$ is, $$y_d = \sqrt{(x_{mp} - x_{mc})^2 + (y_{mp} - y_{mc})^2} \sin\left(\tan^{-1}\left(\frac{y_{mp} - y_{mc}}{x_{mp} - x_{mc}}\right)\right).$$

In the special circumstance of two points $P_1$ and $P_2$ located at the same distance from the two-dimensional coordinate system origin as showing in FIG. 7 ($r_1 = r_2 = r$), the vector difference between $P_{mp}$ and $P_{mc}(|v_d|)$ becomes:

$$|v_d| = v_{mp} - v_{mc} = r - r\cos\frac{\theta_d}{2} = r\left(1 - \cos\frac{\theta_d}{2}\right).$$

If two points $P_1$ and $P_2$ locating each other close enough to be able to be determined that $\widehat{P_1P_2} \approx |P_1P_2|$, then $\widehat{P_1P_{mp}} \approx |P_1P_{mc}|$,
here $\widehat{P_1P_{mp}} = |P_0P_{mp}| \cdot \theta_d/2$,
$|P_1P_{mc}| = |P_0P_{mc}| \cdot \tan \theta_d/2$,
that means $|P_0P_{mp}| \cdot \theta_d/2 - |P_0P_{mc}| \cdot \tan \theta_d/2 \approx 0$,
so if $\theta_d/2 \approx \tan \theta_d/2$,
then $|P_0P_{mp}| \approx |P_0P_{mc}|$,
and $|v_d| = |P_0P_{mp}| - |P_0P_{mc}| \approx 0$.

As proved here, the fundamental assumption of the integral method to calculate an approximate curved path length becomes extremely clear in this special model circumstance. The reason it will be difficult to apply the same assumption in the statistical analysis also becomes clear. The data by whatever method measured, and to whom statistical analysis will be performed is predetermined values and one can not make them showing their straight line segments as short as one please. The actual data measured always shows that there is a difference between the lengths of the straight line segment and the arc segment. The traditional Cartesian coordinate system method assumes the distribution of any data as the linear, including such a data set registered as a combination of a circular distribution(s) and a linear distribution. This limitation of the Cartesian method is caused by the nature of the coordinate system itself. All coordinates of the Cartesian coordinate system constituted with the linear coordinate only. The Cartesian coordinate system method, therefore, has to assume $\theta \approx \tan \theta$, even it has the difficulty to do so, and has to handle all distributions as the linear distribution, and has to assume $|v_d| = |P_0P_{mp}| - |P_0P_{mc}| \approx 0$ in order to set $P_{mp}$ to $P_{mc}$.

FIG. 10 presents the differences of Pmp and Pmc of $P_1$ and P2 when they are located on a circular circumference. This two-dimensional simulation model may help us determining about the statistic analysis difference of two coordinate system approaches by their mean points' difference. The relationships between the directional difference ($\theta_d = \theta_1 - \theta_2$) and the vector difference ($|v_d|$) of two points $P_1$, $P_2$ when $r_1 = r_2 = r$ were generated by the above formula. It shows that when $r = 1 (=e_r)$, if two points separating 3.636 degrees one another directionally, the vector difference of $P_{mp}$ of $P_{mc}$ will become 0.001 as the actual difference of 0.0005035 will be counted as 0.001. The difference of Pmp and Pmc represents the difference of two statistical analysis methods, which means that the magnitude of $|v_d|$ simply caused by the different statistical approach will exceed more than 0.1% value of their own vector (|v|) value when a set of data who have the same vector |v| values (=1) but separating 3.636 degree each other. In case each points of a data set have the different vector (|v|) values, the minimum value of two points directional difference producing more than 0.1% vector |v| value difference becomes dramatically smaller than 3.636 degrees. If the two point's directional difference is within this angle, the different statistical approaches will not result the significant difference. Once the difference of two measuring data exceeds this directional limitation, however, the difference simply caused by the different calculation approaches will become the dominant than the measurement variance interested. Here the number of 0.1% is chosen to expect limiting the calculation difference within 0.1% of the measuring size, but one can set it to any number. For example, when two measurements' data on a point located at 1 kilometer from the calculation origin and expecting the two time measurements' accuracy as within 1 meter, the calculation difference caused by two analysis methods itself can not exceed this limitation (1 meter) so that if those two measuring data separating each other more than 3.636 degree that means separated each other by more than 50.35 centimeter in their |v| values, one must use the adequate coordinate system to correctly analyze statistically. If the directional difference of two measuring data on a point 5 millimeter (r=5) aparted from the calculation origin, for another instance, is 3.636 degrees, their vector difference $|v_d|$ 2.5173 micrometer (=0.0005035×5) is equal to 0.1% of 5 millimeter. In this case, however, if one expects the calculation method difference of two different systems limited within 1 micrometer, the directional difference of two measuring points must be within 1.622 degrees. Here their vector difference will be within $|v_d|$=0.5006 micrometer. Over this limitation, one must apply the statistic analysis method with the adequate coordinate system. P From the variables of $\theta_d$, $|v_d|$ and r, the related variables may be calculated as the following way in some studies:

$x_d = |v_d| \cos \theta_{mp}$, $y_d = |v_d| \sin \theta_{mp}$, $\widehat{P_1P_2} = r \cdot \theta_d$, $|P_1P_2| = 2r \sin \theta_d/2$, $\widehat{P_1P_2} - |P_1P_2| = r \cdot \theta_d - 2r \sin\theta_d/2 = r(\theta_d - 2\sin\theta_d/2)$.

Once the statistical analysis method for two-dimensional coordinate data is clarified, the concept and the procedure can then be applied for the statistical analysis of two points in a three-dimensional coordinate system. FIGS. 11A, 11B, 12A, 12B, 13, 14, 15, and 16, illustrate and summarize the statistical analysis methods of two points in three-dimensional coordinate systems. To avoid unnecessary repetition, the discussion will focus on the definition the third coordinate of both the Cartesian and the Polar coordinate systems.

The third coordinate, z-axis in the Cartesian rectangular coordinate system is crossing at the origin $P_0$ and form rectangles with both x- and y-coordinates. The z-axis coordinate is perpendicular to the xy-plane. The upper-side of $P_0$ on the z-axis represents the positive number that will increase in magnitude as the distance from $P_0$ increases. The lower side of $P_0$ on the z-axis represents the negative number that will decrease in magnitude as the distance from $P_0$ increases. The x-coordinate and the z-coordinate together form the square xz-plane and the y-coordinate and the z-coordinate together forms the square yz-plane. Three square planes (xy, xz, and yz) cross at the origin $P_0$ perpendicularly to each other and together form a rectangular three-dimensional coordinate space.

A point $P_1$ in three-dimensional Cartesian coordinate system with the coordinate pair of x1, y1, and z1 is expressed as P1(x1, y1, z1) in FIG. 10.

$P_1$ in this Cartesian coordinate system is also expressed as being located at the terminal point of the vector $\overrightarrow{P_0P_1}(v_1)$ whose initial point is $P_0$. The vector $v_1$ is represented with the magnitude of the line segment $P0P_1=|v_1|$ and two directions(angles) of $\theta_1$ and $\phi_1$. The angle $\theta_1$ is the horizontal direction and the $\phi_1$ is vertical direction of $v_1$. Both initiate from the positive x-axis and increase in scale counter-clockwise in the xy-plane and in the xz- (yz-) plane, respectively. Notice that the values of x1, y1 and z1 are the scales projected rectilinearly from $P_1$ against x-, y-, z-coordinates respectively, but the direction $\phi_1$ is horizontal circular traced values from $P_1$ against the xz- (or the yz-) plane. The direction $\theta_1$ is generated on the xy-plane itself.

The projection of the vector $\overrightarrow{P_0P_1}(v_1)$ on the xy-plane is often called as the xy-vector of $P_1(xyv_1)$. In this case, $v_1$ shall be called as the xyz-vector of $P_1(xyzv_1)$ in order to distinguish from the xy-vector of $P_1$.

The following relationships exist between the x-, y-, z-coordinate values and the vector values:

$$|v_1| = |_{xyz}v_1| = \sqrt{x_1^2 + y_1^2 + z_1^2},$$

$$|_{xy}v_1| = |v_1|\cos\phi_1 = \sqrt{x_1^2 + y_1^2},$$

$$\theta_1 = \tan^{-1}\left(\frac{y_1}{x_1}\right),$$

$$\phi_1 = \tan^{-1}\left(\frac{z_1}{\sqrt{x_1^2 + y_1^2}}\right),$$

$$x_1 = |v_1|\cos\phi_1\cos\theta_1,$$

$$y_1 = |v_1|\cos\phi_1\sin\theta_1,$$

$$z_1 = |v_1|\sin\phi_1.$$

The initial ray in a three-dimensional Polar coordinate system, horizontally from the origin $P_0$ (to the right) and represents three different coordinates. One is the linear distance coordinate and the other two are the direction coordinates. The two direction coordinates serve as the horizontal direction coordinate and the vertical direction coordinate.

The distance from P0 on the initial ray represents the linear magnitude of the distance r. All magnitudes of the ray are positive (r≧0), and there is no negative r value. The distance coordinate in three-dimensional Polar coordinate system functions as the radius of a sphere and forms a spherical surface so that the r value is the spherical traced value from a point against the linear magnitude coordinate. The projected distance magnitude on the rΘ-plane of Point $P_1$ distance $r_1$ is named as $r_1$.

The horizontal direction (angle Θ) originates from the initial ray and its magnitude is increased counter-clockwise. The distance coordinate and the horizontal direction coordinate together form the circular rΘ-plane. The horizontal angle $\Theta_1$ of $P_1$ is the angle magnitude of $P_1$ rectilinearly projected on the rΘ-plane.

The vertical direction (angle Φ) also originates from the initial ray and increases its magnitude counter-clockwise. The distance coordinate and the vertical direction coordinate together form the circular rΦ-plane. The vertical angle $\Phi_1$ of $P_1$ is represented by the horizontal circular traced values from $P_1$ against the rΦ-plane.

The circular rΘ-plane and the circular rΘ-plane cross at the initial ray perpendicularly so that they and together form a three-dimensional spherical space and the point $P_1$ lies in this sphere.

$P_1$ with the Polar coordinate pair $r_1$, $\Phi$ and $\Theta_1$ is expressed as $P_1(r_1,\Phi_1,\Theta_1)$. The values of $r_1$, $\Phi_1$ and $\Theta_1$ are the values of the respective coordinate themselves.

The relationship between two coordinate systems when they occupy the common origin P0 is illustrated in FIG. 5A. Notice that in this three-dimensional sharing system the initial ray of the Polar coordinate system coincides with the positive x-axis of the Cartesian coordinate system. The xy-plane and the r$\Theta$-plane lie on the same plate but their shape are different. The xz-plane and the r$\Phi$-plane also lie on the same plate and their shape are also different. The yz-plane, however, has no corresponding plane in the Polar coordinate system.

Figure 11A:
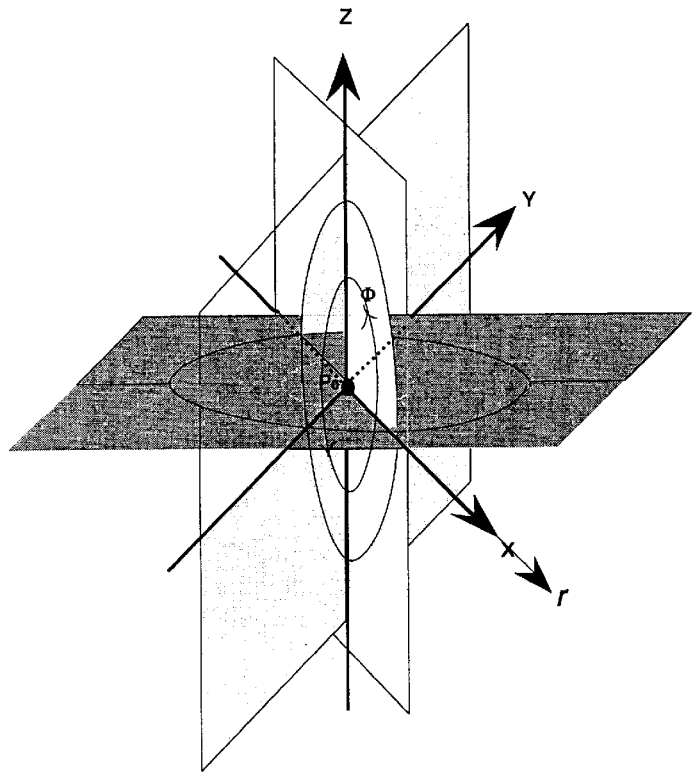
FIG. 11A is a diagram showing a three-dimensional sharing system of a Cartesian coordinate system and Polar coordinate system.
Figure 11B:
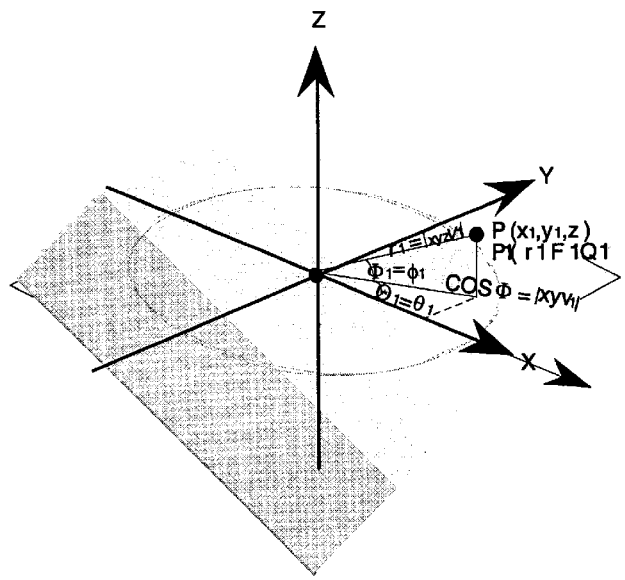
FIG. 11B is a diagram showing a point $P_1$ in a three-dimensional sharing system.
Figure 12A:
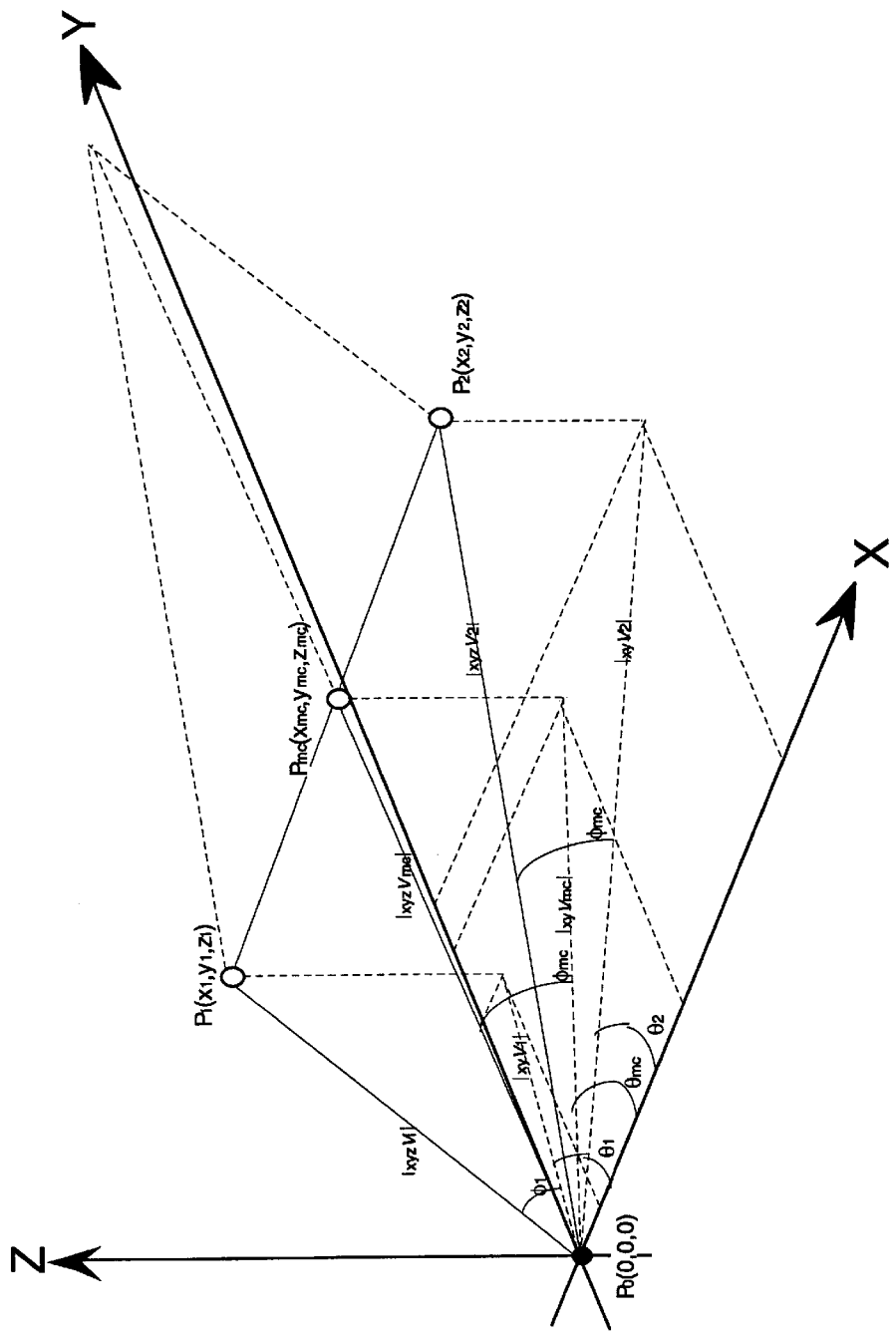
FIG. 12A is a diagram showing a mean value $P_{mc}$ of points $P_1$ and $P_2$ in a three-dimensional Cartesian coordinate system.
Figure 12B:
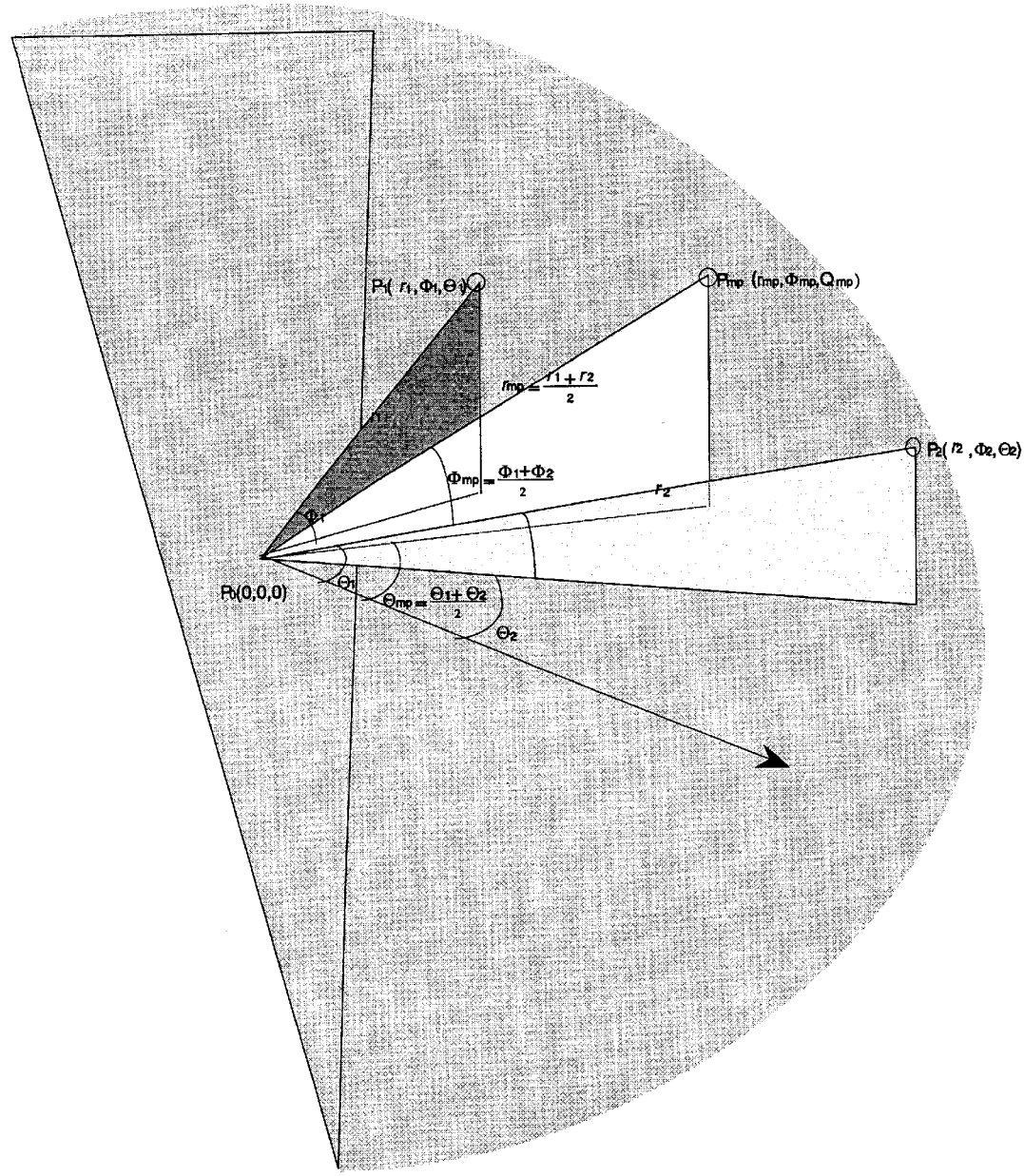
FIG. 12B is a diagram showing a mean value $P_{mp}$ of points $P_1$ and $P_2$ in a three-dimensional Polar coordinate system.
Figure 13:
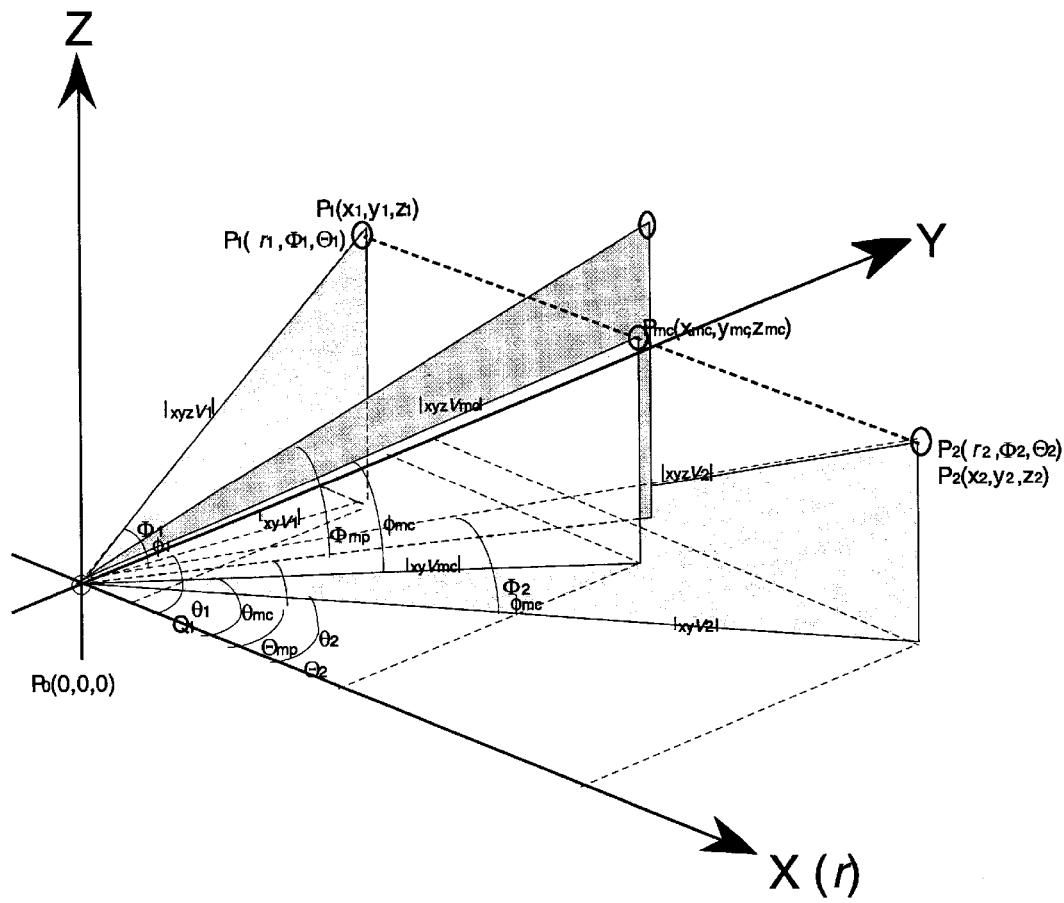
FIG. 13 is a diagram showing the mean values $P_{mc}$ and $P_{mp}$ of points $P_1$ and $P_2$ in a three-dimensional sharing system.

As illustrating in FIG. 11B, a point $P_1$ in the three-dimensional sharing system:

1. The magnitude of the distance coordinate $r_1$ in the Polar coordinate system coincides with the vector magnitude $|v_1|$ in the Cartesian coordinate system. The magnitude of $r_1$ in the Polar coordinate system coincides with the vector magnitude $|xyv_1|$ in the Cartesian coordinate system.
2. The vertical direction coordinate value $\Phi_1$ of the Polar coordinate system coincides with the vector vertical direction $\phi_1$ of the Cartesian coordinate system.
3. The horizontal direction coordinate value $\Theta_1$ of the Polar coordinate system coincides with the vector horizontal direction $\theta_1$ of the Cartesian coordinate system.

On the basis of these relationships of a point's coordinates between two different kinds of three-dimensional coordinate systems, it is possible reciprocally to convert and to transform a point directly from one coordinate system into another.

FIG. 16 summarized the statistical analysis methods of the three-dimensional Cartesian and the Polar coordinate system. In the statistical analysis using the new three-dimensional Polar coordinate system, the mean and the standard deviation of the magnitude of the distance coordinate r are calculated by the linear statistic analysis method. By the directional data statistic analysis method, the means and the circular standard deviations for the directions (F and Q) of the r are generated. The means of the distance magnitude of the r will be converted to the mean distance magnitude of r($=r\cos\phi$) in the three-dimensional Polar coordinate system as well as to the means of the x-, y-, z-coordinate pairs and the magnitudes and the directions of the xyz-vector (xvzv) and the xy-vector (xyv) of the Cartesian coordinate system. There is no way to analyze the variance of the r distance magnitude, the x-, y-, z-coordinates, the xyv and the xyv by the statistical analysis method of the Polar coordinate system because they have only one mean within the database.

Unlike the traditional statistical analysis method of the spherical directional data (K. V. Mardia, Statistics of Directional Data, 1972 Academic Press, London and New York. N. I. Fisher et al., Statistical analysis of spherical data, 1993, Cambridge University Press, Cambridge) which based on three direction cosines of the angles a, b and c, and based on the following relationships of:

l=cos a=cos $\Phi\Theta$, m=cos b=cos $\Phi$sin $\Theta$, n=cos c=sin $\Phi$, $l^2+m^2+n^2=1$, therefore to perform, the author here proposes to simply apply the two-dimensional circular directional data analysis method to the directional coordinate data $\Phi$ and $\Theta$ of three-dimensional polar coordinate system.

All the comparison statistical analysis methods of two-dimensional directional data, therefore, also will be applied in the analysis of the directional coordinate data of three-dimensional Polar coordinate system.

As described previously, in three-dimensional Polar coordinate system the direction $\Theta$ is the rectilinearly projected value on the r$\Theta$-plane, whereas the direction $\Phi$ is the horizontal circular traced value against the r$\Phi$-plane so that the horizontal and the vertical component values of the $\Theta$-coordinate and the $\Phi$-coordinate on the corresponding the r$\Theta$- and the r$\Phi$-plane are:

the horizontal component of $\Theta$:

$$\hat{x} = \cos\Theta, \text{ so } \hat{x}_{mp} = \frac{1}{i}\sum_{n=1}^{i}\cos\Theta_i,$$

the vertical component of $\Theta$:

$$\hat{y} = \sin\Theta, \text{ so } \hat{y}_{mp} = \frac{1}{i}\sum_{n=1}^{i}\sin\Theta_n,$$

the horizontal component of r:

$$\Phi = \sin\Phi, \text{ so } \hat{z}_{mp} = \frac{1}{i}\sum_{n=1}^{i}\sin\Phi_n,$$

the vertical component of $\Phi$:

$$\hat{r}' = \cos\Phi, \text{ so } \hat{r}'_{mp} = \frac{1}{i}\sum_{n=1}^{i}\cos\Phi_n.$$

The means and the circular standard deviations of $\Theta$ and $\Phi$ are:

$$\Theta_{mp} = \tan^{-1}\frac{\sum_{n=1}^{i}\sin\Theta_n}{\sum_{n=1}^{i}\cos\Theta_n},$$

$$C.S.D = \sqrt{-2\log_e\frac{1}{i}\sqrt{\left(\sum_{n=1}^{i}\cos\Theta_n\right)^2+\left(\sum_{n=1}^{i}\sin\Theta_n\right)^2}},$$

$$\Phi_{mp} = \tan^{-1}\frac{\sum_{n=1}^{i}\sin\Phi_n}{\sum_{n=1}^{i}\cos\Phi_n},$$

$$C.S.D = \sqrt{-2\log_e\frac{1}{i}\sqrt{\left(\sum_{n=1}^{i}\cos\Phi_n\right)^2+\left(\sum_{n=1}^{i}\sin\Phi_n\right)^2}}.$$

In contrast to the Polar coordinate system, in the traditional three-dimensional Cartesian coordinate system, the mean and standard deviation of each x, y, z coordinates are calculated by the linear statistic analysis method. The mean magnitudes and the mean directions of the xy-vector (xyv) and the xyz-vector (xyzv) as well as the mean magnitudes and the mean directions of the r and the r' of the Polar coordinate system are composed or converted from the mean x-, y-, z-coordinate values. There is no way to analyze their variances because they have only one mean value.

Both the traditional Cartesian and the new Polar coordinate systems with respect to performing the statistical analysis on the different coordinate data have certain advantages and limitations. With the Cartesian coordinate system only the x-, y-, z-coordinate data can be analyzed for descriptive and comparison tastics. For the Polar coordinate system, only the magnitude and the directions of the r data can be analyzed. The statistical analysis of data will be always limited to the coordinate data of each coordinate system. Statistical analysis on such data composed or converted from the original coordinate data is impossible.

The mean values appear to be the only exception to this limitation as the mean values of both the coordinate data, and the composed or the converted data from the coordinate data, are always able to be generated in either coordinate systems. However, the mean point of a data set generated with the Cartesian coordinate system may not be the same mean point of the same data set when generated by the Polar coordinate system. As was shown earlier, the mean points of a Cartesian or a Polar coordinate systems are not identical ($P_{mc} \neq P_{mp}$) unless the data points are collinear with the origin point $P_0$, and are within the same octant.

To further demonstrate the method of the present invention, including the Polar coordinate approach for statistical analysis, three specific applications will be discussed.

First, in the field of dentistry, it is desired to more accurately and precisely analyze the fit between an implant abutment and the prosthesis framework. If fit between the implant and the framework is not accurate, the anchorage unit could be potentially over loaded. Although the fit between the bearing surfaces of the implant abutment and prosthesis framework has been questioned as a significant factor in stress transfer, bio-mechanics of an implant system occurrence of complications, and the response of the host tissues at the biological interface, little scientific documentation has been reported to prove this relationship scientifically. To a major extent, failure to establish correlations has been due to the lack of a complete understanding of the transformation of three-dimensional data vectors that are required for spacial orientation research.

Figure 17A:
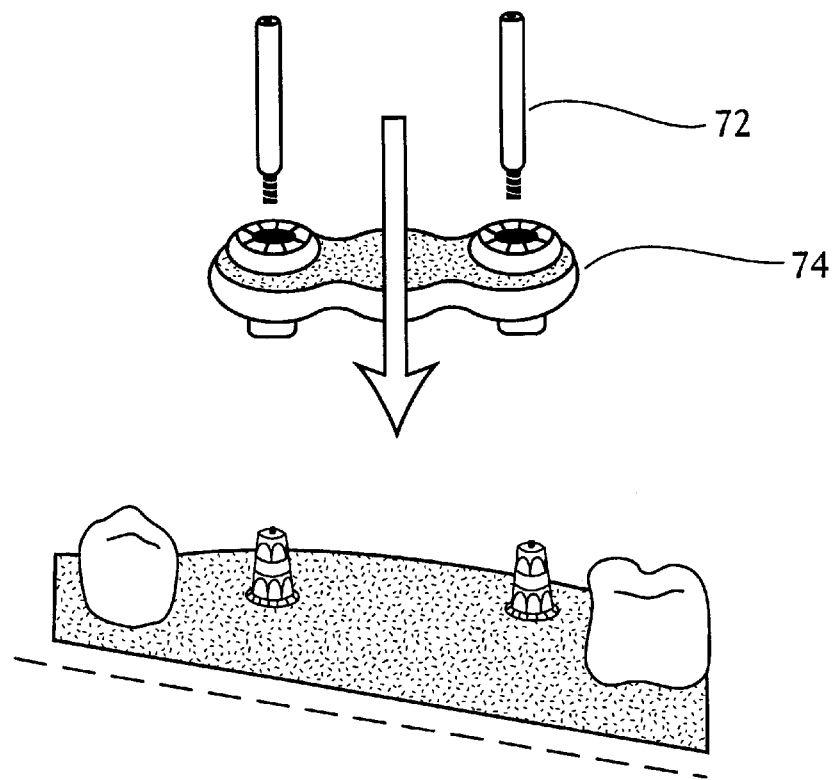
FIG. 17A is a diagram showing the fit between a dental implant abutment and the prosthesis framework that is analyzed using the method of the present invention.
Figure 17B:
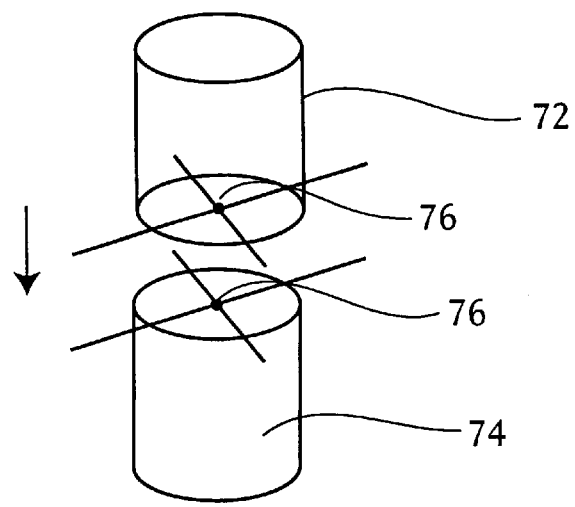
FIG. 17B is a diagram showing the implant abutment bearing surface being combined with the bearing surface of the prosthesis framework.

FIG. 17A is a diagram showing the fit between a dental implant abutment 72 and the prosthesis framework 74 that will be analyzed using the method of the present invention. Generally, the bearing surfaces of implant abutments or framework components are measured using three-dimensional coordinate measuring system. To determine fit, the bearing surfaces of implant abutments are measured in relation to a known zero point that defines the coordinate space of the measurement instrument. Data is collected in the x-, y- and z-axes for each abutment oriented to this zero point, and then is reduced to a single point representing the bearing surface using the Centroid method which was reported by Tan et al. The bearing surface data provides xy vector values that are used to compute the centroid points 76 (i.e., a single point of the long axis of the implant abutment and located on the bearing surface mean) as best seen in FIG. 17B. Each implant abutment is oriented three-dimensionally to the zero point of the measurement coordinate space.

The centroid point demonstrates a relationship to the zero point of the coordinate space that is represented by xy and xyz vectors that have magnitude and direction. The magnitude of the xy vector is determined by lowering point P on its z-axis to the xy plane. The xy vector is a product of the x- and z-axis values as measured from the zero point of the coordinate space. The direction of the xy vector is defined as an angle on the xy plane from the x-axis around the z-axis. The xyz vector magnitude is computed from the xy vector and the z-axis point at point P. The xyz vector direction is measured as the angle formed by the xyz vector and the xy plane from the zero point. In a similar manner, the xy and xyz vectors of the centroid points for framework implant components are measured in relation to the zero point of its coordinate space. It is extremely important to re-emphasize that a centroid point occupies a position within the coordinate space defined by xy and xyz vectors, and that both of these vectors have magnitude and direction.

Matching the component data sets is accomplished by using a minimum of three references that are common to both the implant abutment and framework component. In any matching process, there is a "baseline" data set and a second data set that is matched to the baseline data. In this example, the baseline data is for the implant abutments and the framework components will be the matched data set. Most three-dimensional measurement systems in use today collect and match the data sets in the manner described. However, the limitation in three-dimensional measurement systems are incomplete transformation of the vector values, and presentation of the data in a form that does "not truly" represent an appropriate data analysis and the real fit situation observed clinically.

Presently, the misfit between a matched implant abutment and a framework component at the centroid points is described by a space vector in the xy plane and z-axis value. This reporting format was meant to assist in understanding what was observed when a framework was fitted to a master cast. The misfit often produced an angular gap (the bearing surfaces are not parallel) that could be present at any position around the circumference of the matched implant abutment and framework component. In reporting the misfit, data was usually transformed to express the angular gap theoretically and the gap dimension was calculated as the vertical (z-axis) at a distance of 4.5 mm (the diameter of the implant abutment) from the theoretical intersection of the two matched bearing surfaces. Using a theoretical calculation to describe the angular gap is an incomplete analysis. It fails to demonstrate the difference between the components that are expressed by xy and xyz vectors in that these vectors have magnitude and direction. Previous analysis on the precision of fit reported only the magnitude of the xy vector and differences in the z-axis gap. These reports also reported the direction of the xy vector differences between the matched pair of component centroids. However, only the magnitude of the xy vector and the z-axis gap were used in data analysis. The direction of the xy vector was not considered in the analysis. Using only the magnitude and not direction in the analysis is an error. Magnitude and direction are dependent variables and cannot be separated when accessing fit for significant differences.

Therefore, using the method of the present invention, including the Polar coordinate approach, the precision of fit between two centroid points, one for the implant abutment and the second one for the framework component can be more accurately and precisely measured. The magnitudes of the xy and xyz vectors for these two points ($P_1$ and $P_2$) can be analyzed by an analysis of variance (ANOVA) and pair wise comparison performed using the Post-Hoc test. Z-axis has differences for the two centroid points have been reported using the T-test or ANOVA, however this is not appropriate because using the direction factor of the xyz vector for orientation prior to the z-axis comparison would result in a totally different z-axis value. When comparing $P_1$ and $P_2$ using vectors with both magnitude and direction to orient the vectors in space, the computed differences of magnitude of the vectors can be analyzed using the ANOVA and the Post-Hoc test for significant differences. However, for vector directional analysis, the circular data analysis method must be applied (significant differences in the direction data are determined by Watson's F-test). Therefore, the Polar coordinate approach of the present invention, which is capable of computing true mean values for the directional components of the xy and xyz vectors, can be used to analyze the fit between the implant abutment and framework component.

The centroid point for the implant abutment is represented as the zero point with a coordinate space represented as a sphere with a 2.25 mm radius. The mean x- and z-axis values derived from digitizing the implant abutment bearing surface are used to compute the xy vector which originates from the zero point on the xy plane, and have both magnitude and direction. The direction of the xy vector is determined as the angle formed on the xy plane around the zero point.

The centroid point for a framework component ($P_2$) in the mean x- and y-axis values derived from digitizing the component bearing surface are used to compute the xy vector which originates at the zero point and also has both magnitude and direction. During the matching process and the transformation of the vector data, point $P_2$x-, $P_2$y-, and $P_2$x-axis values are used to compute the xyz vector that originates at the matched zero points and extends to point $P_2$. The direction of the xyz vector is measured as the angle formed by the xyz vector and the xy plane. A vertical line extending from point $P_1$ to $P_2$ is the z-axis gap between the two bearing surfaces of the matched components that is referred to as the angular gap. In data comparisons and analysis both the magnitude and the direction are used in calculating the angular gap. The angular gap at $P_2$ also has a reverse angular gap located within the coordinate space opposite to the angular gap. This is the results of the xy vector magnitude and direction computations. The real angular gap situation seen clinically is a combination of these two gaps.

A set of fit data has been derived to further illustrate the method of the present invention as applied to the dentistry application. The data represents the precision of fit between the framework of an implant prosthesis and the implant abutments that support the framework. The framework data is represented by the centroid point and the angular gap point of five implant prostheses that will be matched to the five implant abutments in the framework. Before comparing the framework to the abutment, the first step is to establish statistically the mean data for the implant framework. The framework was measured three times and the data sets named bmc1, bmc2 and bmc3. Between each measurement session, the framework was repositioned within the coordinate space of the measurement instrument. However, this relocation procedure does not create an error in the data.

The differences between each time measurement session were matched and computed by selecting one data set for the framework as the baseline measurement and comparing this data set with the other two data sets. In this example, bmc2 was selected as the baseline and the bmc2-bmc1 and the bmc2-bmc3 were computed through the matching. The x-, y-, z-coordinate data of the centroid points and the angular gap points of each centroid point position of the framework are presented in FIG. 18. The magnitudes and the directions of the xy-vector and the xyz-vector of both points that composed from their x-, y-, z-coordinate values are also presented in FIG. 18. The direction unit is in degree. The origin of the xy-vector direction is to the left and the xyz-vector direction origin is to the right in the xy-plane and the xz-plane respectively.

From the data in FIG. 18, it is possible to generate two sets of the descriptive statistic data. The first set is generated by the Cartesian coordinate system (shown in FIG. 19), and the second set by the Polar coordinate system (shown in FIG. 20). Differences in the means generated by the two coordinate systems is presented in FIG. 21, and are summarized as follows:

1. The mean magnitude and the mean direction of xyz-vector and the directed distance r generated by the two coordinate systems from the same data set are not identical for all 10 data points (Two data points of the centroid point and the angular gap point for each of five centroid point positions for one framework).

The maximum direction difference of the centroid r and xyz-vector is 28.55 degree at position 3 whose magnitude difference of r and xyz-vector is the minimum (0.3 mm) among the five positions. At position 1 centroid point whose r and xyz-vector magnitude differences are the maximum (4.6 mm), the direction difference (2.6 degree) was the smallest.

Such a reversed relationship between the magnitude difference and the direction difference also was found for the angular gap point. At position 1, the r and xyz-vector magnitude difference 526.4 mm was the maximum among 5 positions and demonstrated the second to the smallest direction difference at 0.14 degree. At position 3 shows the magnitude difference 3.1 mm was the minimum, but yet demonstrated the maximum directional difference of 0.52 degree.

A little more than a half millimeter difference in the xyz-vector magnitude produced a huge difference when compared to the radius (2.25 mm) of an implant component at each position. A nearly 30 degree difference of the centroid point xyz-vector direction difference is also very large. It can be compared to transforming this direction difference (28.55 degree=0.50 radian) by the component radius, and then the z-value becomes a large linear value equal to 1.075 mm (=2.25 sin 0.5).

2. It seems very understandable that the angular gap point r and xyz-vector magnitude differences of two coordinate systems are directly related to the r' and xy-vector magnitude differences because the z-coordinate differences are so small comparing them ($|\overrightarrow{xyz}|/|\overrightarrow{xy}| \approx 1$). With the same reasoning, the mean magnitude differences of the x-, and y-coordinates are also closely related to the xyz-vector magnitude. All four mean magnitude differences of two coordinate systems are ranked from the maximum to the minimum differences at positions 1, 2, 5, 4 and 3 with the exception being the y-coordinate for position 4 ranked third, and position 5 ranked fourth.

In short, it is concluded that the differences in the means generated by these two methods of analysis often become very extreme for the vector directions of the centroid points and for the vector magnitudes of the angular gap points. The maximum direction difference of the centroid point r and xyz vector is 28.55 degree at position 3. The centroid point r' and xy-vector directional differences of positions 1 and 5 are 36.35 and 21.52 degrees, respectively. The angular gap point magnitude difference between r and xyz-vector (and between r' and xy-vector) at position 1 was 526.4 mm.

From this example, it has been demonstrated that the mean centroid point and the mean angular gap point generated by the Cartesian and by the Polar coordinate system occupy their unique location in three-dimensional space. There is no identical point shared by two mean points generated by two different coordinate systems.

Applying the new Polar coordinate method for the statistical analysis of the data in FIG. 18 will produce significantly different results from the traditional Cartesian coordinate method. All the original xyz-vector magnitudes of the angular gap point composed from the x-, y-, and z-coordinate values in the Cartesian coordinate system are 2.25 mm. Because of the uniformity in the magnitude, the angular gap point rather than the centroid point will be used as a model to discuss which analysis method more precisely the "truth".

FIG. 20 shows that by the Polar coordinate system method the mean xyz-vector magnitudes of all angular gap points are the same as the original 2.25 mm, which means that all the mean points of the angular gap point remain somewhere on the circumference of the implant framework component at each position. As shown in FIG. 4, if $P_1$ and $P_2$ are located on a circular circumference (radius=r), then $P_{mp}$ is also located at the same circumference of $\frac{1}{2}(r_1+r_2)=r$, and $\widehat{P_1P_{mp}''} = \widehat{P_{mp}P_2''}$. The mean point $P_{mp}$ of $P_1$ and $P_2$ is the midpoint of the circumference segment of $\widehat{P_1P_2}$. The Polar coordinate system method generates a midpoint of a circumference segment. Using the Cartesian coordinate system method, all the mean points of the angular gap point are not located on the component circumference, however, they are somewhere inside the circumference. The Cartesian coordinate system method generates a midpoint of a line segment. Table 1.2 shows that mean xyz-vector magnitudes of all angular gap points are less than the original 2.25 mm.

The mean point of a set of the circumference points must be located somewhere on this circumference. Therefore, it may be concluded that the statistical analysis method of the Cartesian coordinate system should not be chosen for the analysis as it generates an untrue mean from a set of data collected on the circular circumference. The mean is the fundamental element for all statistical analysis.

Note that mean data for implant abutment is not been discussed, but that to compare the implant abutment to the framework using the method of the present invention, similar computations are necessary. Then, by following the method of the present invention, the orientation vector data from centrold points can be used to analyze the fit between an implant abutment and the framework component. The xy and xyz vector magnitude and direction are used in all data computations. When applied the precision of this fit, this method provides the capability of demonstrating orientation data in an analysis that is more representative of the real fit situation. In doing so, this data and analysis may aid researchers in demonstrating correlations between fit and stress transfer, adverse biological responses and complications in prosthetic reconstruction.

It is envisioned that the method of the present invention as applied to the above dentistry application, can be extended to analyze the fit between any two combined physical objects. For example, one skilled in the art will recognize from such discussion that this method could be applied to the assembly of two automotive part, or other numerous applications where two physical objects are being combined.

In another application of the method of the present invention, the differences in the locations of cast and welded bar centroid points are analyzed for six different welding techniques. Laser welding has been used in assembling parts or components in the automotive, medical, dental, electronic and other high-tech manufacturing industries. Using Neodymium Yttrium-Aluminum-Garnet Pulse Laser Welder (ND: YAG-Pulse Laser) to join two or more parts has the advantage of decreasing cost while increasing accuracy and/or precision in the assembled relationship of the two parts.

Although several laser welding techniques have been employed, the technique that is most accurate can only be determined through the statistical analysis of the welding data. In the past, the traditional Cartesian coordinate approach has been used to analyze welding data, however the method from the present invention can also be used to perform statistical analysis on the welding data.

Figure 22:
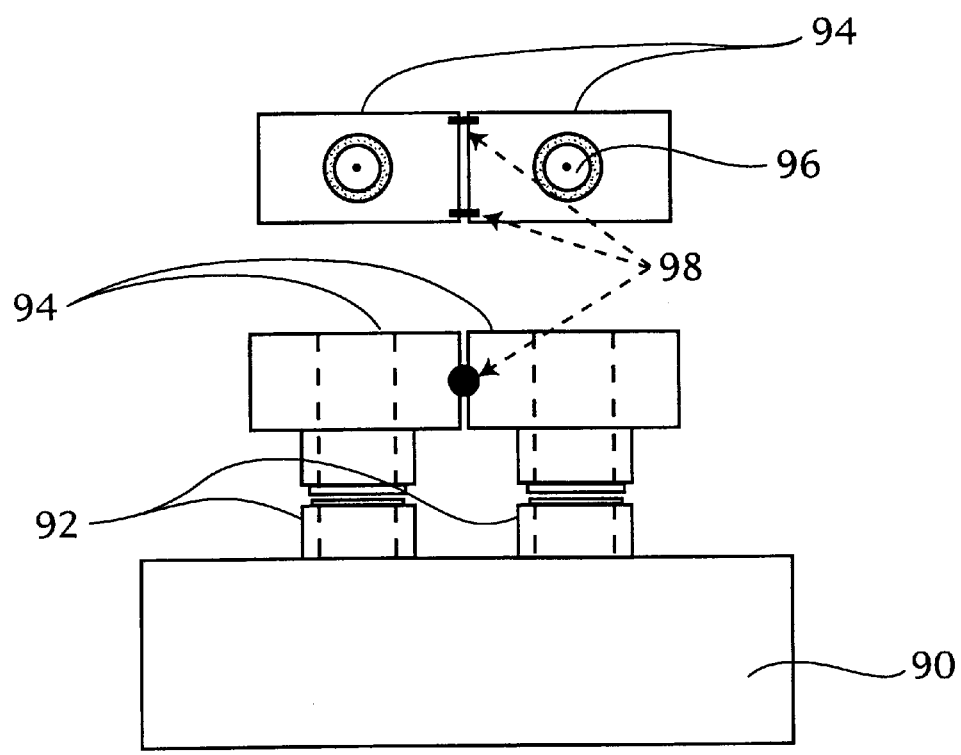
FIG. 22 is a diagram showing the welding platforms and two welding bars that are to joined together by laser welding that is to be analyzed using the method of the present invention.

As shown in FIG. 22, a specific welding condition cast 90 was created were two welding platforms 92 were positioned exactly 10.0 mm apart. Welding platforms 92 provided circular bearing surfaces that could be mated to similar circular bearing surfaces located on two bars 94 that were to be joined together by laser welding. Eighteen replicas of the welding condition cast were created for this study. The Centroid measurement method was used to measure the precise location of a point in the center of each circular bearing surface using a three-dimensional digitizer. The center point called the centroid 96 is located on the xy-plane of each bearing surface and centered on the long axis of the bearing platform. The four centroid points are defined from data collected from the surface of the circular bearing surface using a digitizing instrument that collects over four thousand three-dimensional data points on the bearing surface. When the centroid points are compared (the two in the welding condition cast are matched to the two in the welding bars) any differences in the space vectors of the welding condition cast centroid points and the welded bar centroid points are the result of the particular welding technique employed in this welding analysis.

For the purpose for demonstrating the method of the present invention, the following six different laser welding techniques were performed in joining the two bars:

1. A single tack-weld (ST) was made in the center of the welding cite on the superior surfaces of the two bars to be joined.
2. A corner tack-weld (CT) was made on both sides of the welding cite at the junction of the superior surface of the bars with the side surfaces of the bars.
3. A bilateral tack-weld (BT) was made in the mid portions of the side surfaces of the two bars at the welding cite.
4. A single tack-weld was made in the center of the weld cite on the superior surfaces of the two bars followed by stereopulsed continuous welds (STC) on both sides of the welding cite.
5. A corner tack-weld was made on both sides of the welding cite at the junction of the superior surface of the bars with the side surfaces of the bars followed by stereopulsed continuous welds (CTS) on both sides of the welding cite.
6. A bilateral tack-weld was made in the mid portions of the side surfaces of the two bars at the welding cite followed by stereopulsed continuous welds (BTM) on both sides of the welding cite.

Prior to the start of each welding test, the circular bearing surfaces of each welded bar 94 were fifted to the circular bearing surfaces of welding condition cast 90 and the welding cite was adjusted until a small gap of 0.100 mm existed between two welded bars 94. Two welded bars 94 were then attached to welding condition cast 90 using a simple rigid screw (not shown) and the welding technique was performed. Three such assemblies were created for each of the six welding techniques.

To evaluate the six different laser welding techniques, the mid-point of the centroid points of the left side location and the right side location for both the welding condition cast and the welded bar were matched to the x-, y- and z-axis zero point of the measuring space, and this way, any differences as a function welding, would occur at both the right and left side locations equally. However, for this study, all differences as a result of the six welding techniques were reported as differences between the centroid points of the welding condition cast and the welding bar on the right side location. The measurement data as well as the results for this study are found in FIGS. 23A, 23B, 24A, 24B, 25, 26A and 26B. As best seen in the table of FIG. 25, the pairwise comparison results show that each of the six welding techniques exhibited a significant change (i.e., <0.05) between the centroid point of the welding condition cast and the welding bar (for each of its three vector values) after the welding process. However, using the Polar coordinate approach, the change between centroid points is more accurately and precisely analyzed. Moreover, by using the Polar coordinate approach it was shown that the BT welding technique demonstrated no significant change (i.e., each vector value >0.05) as a result of the welding process. It is envisioned that by applying the method of the present invention that not only can different welding techniques be assessed, but (regardless of the technique) the fit between the two welded parts can also be analyzed to determine its accuracy and precision. Therefore, laser welding application is another example of how the method of the present invention can be extended to different applications that involve combining two entities.

Figure 27:
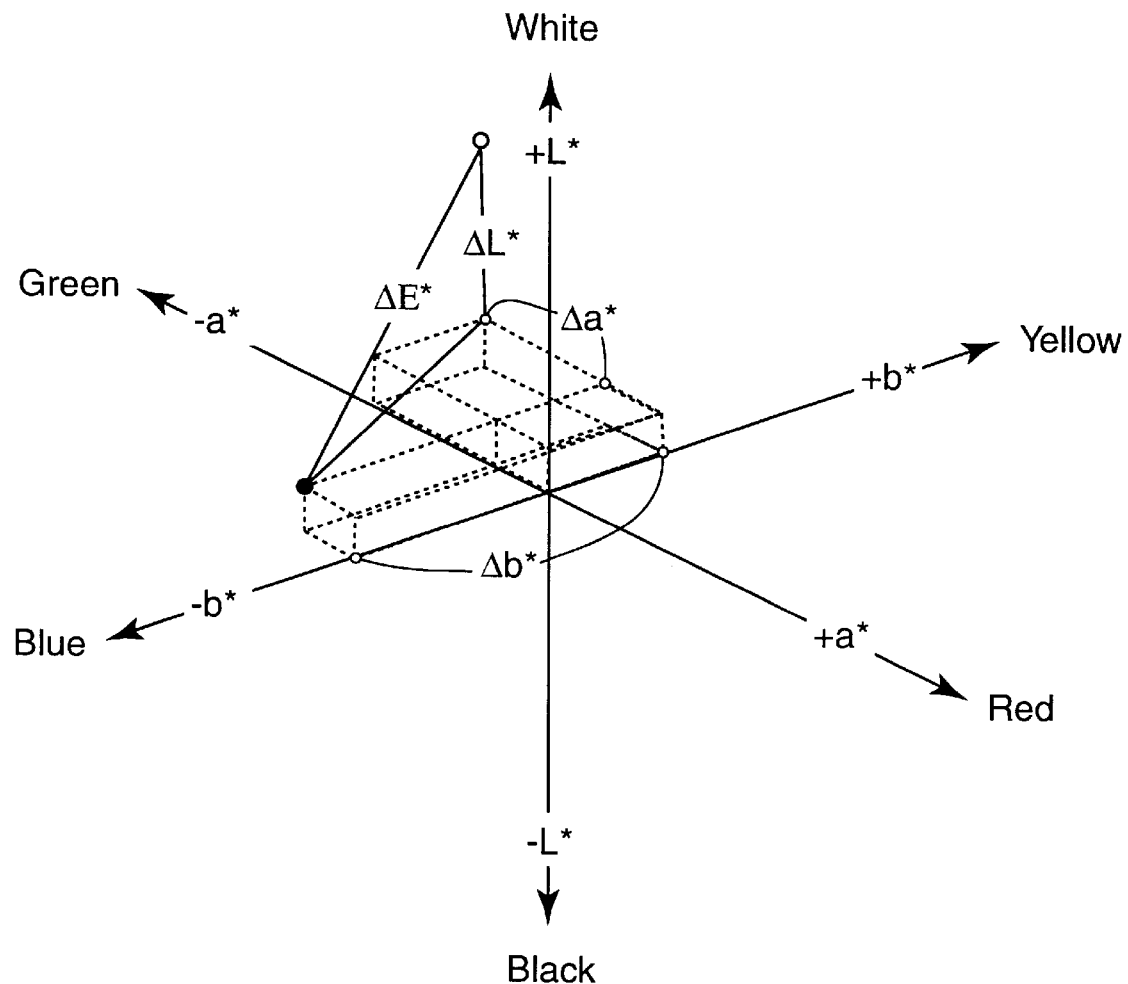
FIG. 27 is a diagram that represents how color is mapped to a three-dimensional coordinate system.

Although the discussion has focussed on analyzing the spatial orientation between physical entities, the method of the present invention can also be applied to other entities that occupy two and three-dimensional space, including color. FIG. 27 illustrates how color can map to a three-dimensional coordinate. To set the background for a discussion of the application of the present invention to color, please consider the following discussion.

During the 75th General Session of the International Association of Dental Research in March of 1997, there were 56 presentations that dealt with the study of color. Twenty-seven (27) of the scientific papers used the CIE (Commission Internationale de I'Eclairege, 1931) chromaticity coordinates as part of their experimental protocol. In 1974, the International Committee of Illumination stated that color was an entity that occupied a three-dimensional space. Further, that the total color difference($\Delta E = \Delta E_{ab}^*$) of the sample and the standard is shown by the equation $$\Delta E = \sqrt{(\Delta L^*)^2 + (\Delta a^*)^2 + (\Delta b^*)^2} \tag{1}$$

Here, $\Delta L^*$ is the brightness difference,
$\Delta a^*$ and $\Delta b^*$ are the chromaticity differences.

If the color difference of color sample 1(C1) and color sample 2(C2) is $E_{1-2}$, and if $L_1, a_1, b_1$ and $L_2, a_2, b_2$ are the brightness and the chromaticities for the C1 and C2 color samples respectively, then their differences can be expressed by the formula:

$$E_{1-2} = \sqrt{(L_1 - L_2)^2 + (a_1 - a_2)^2 + (b_1 - b_2)^2}.$$

This formula is equivalent to the vector difference formula in the three-dimensional Cartesian rectangular coordinate system, and the statistical analysis on the variables $\Delta E, \Delta L, \Delta a, \Delta b$ must be performed using this system. However, several of the papers at 1997 IADR meeting failed to recognize this relationship, clearly illustrating how common the confusion is among researchers.

1. Fifteen (15) papers of the abstracts reported the analysis of data by the Polar coordinate system statistical method. In other words, $\Delta E$ ($\overline{\Delta E}$) was calculated using formula (2) from the Polar coordinate system as the mean linear magnitude.

$$\overline{\Delta E} = \frac{\sum_{n=1}^{i} \Delta E_n}{i}. \tag{2}$$

This will result in an error. Researchers should have applied the formula (3) instead of the formula (2).

$$\overline{\Delta E} = \sqrt{(\overline{\Delta L})^2 + (\overline{\Delta a})^2 + (\overline{\Delta b})^2}, \tag{3}$$

here $\overline{\Delta L} = \dfrac{\sum_{n=1}^{i} \Delta L_n}{i}, \overline{\Delta a} = \dfrac{\sum_{n=1}^{i} \Delta a_n}{i}, \overline{\Delta b} = \dfrac{\sum_{n=1}^{i} \Delta b_n}{i}.$ Clearly, any linear statistical analysis can not be performed on $\overline{\Delta E}$.

2. Twelve (12) of the 1971 IADR abstracts generated the mean values of $\Delta E, \Delta L, \Delta a, \Delta b$ using the formulas:

$$\overline{\Delta E} = \frac{\sum_{n=1}^{i} \Delta E_n}{i}, \tag{2}$$

$$\overline{\Delta L} = \frac{\sum_{n=1}^{i} \Delta L_n}{i}, \tag{4}$$

$$\overline{\Delta a} = \frac{\sum_{n=1}^{i} \Delta a_n}{i}, \tag{5}$$

$$\overline{\Delta b} = \frac{\sum_{n=1}^{i} \Delta b_n}{i}. \tag{6}$$

They also performed the linear statistical analysis on each of variables $\Delta E, \Delta L, \Delta a, \Delta b$ data. These investigators have used both of these two totally different coordinate systems and assumed that $$\sqrt{(L_1 - L_2)^2 + (a_1 - a_2)^2 + (b_1 - b_2)^2} = \frac{\sum_{n=1}^{i} \Delta E_n}{i}.$$

However, by applying the method of the present invention more accurate and precise color matching can be accomplished. One skilled in the art will readily recognize from previous discussions, that by applying the method of the present invention, including the Polar coordinate statistical analysis approach, a color (i.e., paint color) can be manufactured to more closely represent a target or base line color.

From these examples it has been demonstrated that differences in the statistical analysis can result (from the same data set) depending on which coordinate system is selected for the analysis. Although it has been a common practice in the past (based on the assumption of Tan $\Theta = \Theta$), both analysis methods should not be mixed during the analysis of a data set. However, the question remains as to which method of statistical analysis should be chosen for the particular application.

The magnitude of the difference resulting from two analysis methods refers to the magnitude of the vector of each data and the directional difference among a set of data. If the calculation difference magnitude is smaller than the variance which one has an interest in, it will not be a problem to use either coordinate system when performing the statistical analysis. However, if the calculation difference magnitude exceeds a predetermined variance, then it becomes extremely important to choose the appropriate system to statistically analyze the data. It has been shown that this magnitude limitation is very small for the general statistical analysis standard, so that one of the coordinate systems must be chosen to adequately perform the statistical analysis.

The distribution type of data being collected can be indicative of which coordinate system to select. If the variable registers a combination of a linear distribution and a distribution function of a circle(s) in two-dimensional plane(s), then the method of the present invention, including the Polar coordinate approach, should be applied. If the variable sampled presents only a linear distribution function in two-dimensional planes(s), then traditional Cartesian coordinate system methods should be used.

The scales of the linear coordinate and the directional coordinate can also be used to select the coordinate system. The linear coordinate scale represents the linear magnitude of the unit length. In contrast, the directional coordinate scale represents the angular magnitude that is a pure number. An angle is the ratio of an arc length and the radius (length) of the circle, and the radian (or degree) commonly referred to as the unit of the angle is not one of the fundamental quantities. In a coordinate system, each linear coordinate (axis) represents one unique category. A unique category is defined as a distinctive character or property of nature and can be expressed as a variable of a linear magnitude (scale). Each unique category has a different quality. A linear statistical analysis is only valid if a set of variables of a linear coordinate data shows a normal distribution.

Each directional coordinate is expressed as a variable of an angular magnitude in a coordinate system, which represents a gradient of a unique category. The directional coordinate itself does not functionally represent a unique category. A directional statistical analysis is only valid if a set of variables of circular directional coordinate data shows a von Mises distribution.

A two- or three-dimensional Cartesian coordinate system has two or three linear coordinates. Each linear coordinate represents its unique category and a data set for each variable of each coordinate showing a normal distribution can be analyzed by the linear statistic method. Composed data in a two or three-dimensional Cartesian coordinate system is a data set composed by two or three unique categories so that the distribution of a data set of each variable of the Cartesian coordinate system also is composed by two or three linear distributions.

On the other hand, a two- or three-dimensional Polar coordinate system has a linear coordinate that always involves only one coordinate (ray), which means that in the Polar coordinate system there is only one unique category. The other one or two circular directional coordinate(s) only represent the gradient of this category. Composed data in the two- or three-dimensional Polar coordinate system are data composed of one unique category and its gradient(s). The distribution of a data set of variables in the Polar coordinate system is composed of one linear distribution and one or two circular directional distributions(s).

The value of data in a two- or three-dimensional coordinate system is a composed value of those coordinate values.

Thus, if it is determined that data are composed with two or three unique categories, a data set of variables must be analyzed statistically in the Cartesian coordinate system which has tow or three linear coordinate (axes) capable of representing each unique category. If the data has only one unique category, a data set of variables should be analyzed statistically in the new Polar coordinate system and must not be performed in the Cartesian coordinate system.

The choice of which coordinate system to select for the statistical analysis depends totally on the nature of the data. If the data is composed by more than one unique category, the statistically analysis must be performed using the Cartesian coordinate system. If the data is constituted with only one unique category, the statistically analysis of this data must be performed using the Polar coordinate system and must not be performed in the Cartesian coordinate system.

A further example on which coordinate method to select can be found by using data related to such entities of orientation, location, distance, shape, size and volume. The first question to be addressed is whether the entity is composed variables with only one unique category or they composed by more than one unique categories? The following definitions of the above-referenced entities may help to better understand the selection process:

Orientation: The direction(s) from the initial ray. The assumption is that the unit magnitude er represents all of data's linear magnitude, however, all the linear magnitude data will not be presented in the orientation data.

Location: The position of a point expressed as a linear magnitude of this point from the origin point and the direction(s) from the initial ray.

Distance: The differences in the magnitude and the direction(s) of two points that have their own location.

Shape: The trace (locus) of multiple points that have their own location.

Size and Volume: The integral of multiple points that have their own location in two or three-dimensional space respectively.

There are seven fundamental quantities: length, time, mass, temperature, electric current, luminous intensity, and the amount of a substance. These fundamental quantities might be the equivalence of the unique category previously described. Regardless, these definitions make it clear that the above entities have only one unique category (i.e., length), and that the Polar coordinate system instead of the Cartesian coordinate system should be applied to the statistical analysis of these kinds of entity's data.

The foregoing discloses and describes merely exemplary embodiments of the present invention. One skilled in the art will readily recognize from such discussion, and from the accompanying drawings and claims, that various changes modifications and variations can be made therein without departing from the spirit and scope of the present invention.

I claim:

1. A method for positioning a first physical object in a physical space, the physical space being referenced by a first coordinate system, said method comprising steps of:

defining a first point in said first coordinate system;

defining a second point on the first physical object;

positioning the first physical object into the physical space, such that the second point on the first physical object is defined in said first coordinate system;

determining a location of said second point by taking at least two measurements of said second point in relation to said first coordinate system, after performing said positioning;

generating a linear mean value and a directional mean value for said first point and the location of said second point by performing statistical analysis in a second coordinate system, having a linear coordinate and at least one directional coordinate; and adjusting the position of the location of said second point with respect to said first point using said linear mean value and said directional mean value, thereby positioning the first physical object in the physical space.

2. The method of claim 1 further including the step of positioning a second physical object into said first coordinate system using said linear mean and said directional mean value.

3. The method of claim 1 wherein the step of adjusting the position further comprises positioning said second point on said first physical object to align with said first point in said first coordinate system.

4. The method of claim 1 wherein said first point and the location of said second point having coordinate values taken with respect to said first coordinate system.

5. The method of claim 1 further comprising the step of transforming said measurements into vector data, before performing statistical analysis.

6. The method of claim 1 further comprising the step of converting linear mean value and directional mean value into mean coordinate values in said first coordinate system, before analyzing said second location with respect to said first location.

7. The method of claim 1 wherein said first coordinate system is a Cartesian corrdinate system.

8. The method of claim 1 wherein said second coordinate system is at least one of a Polar coordinate system and a Spherical coordinate system.

9. A method for combining a first physical object and a second physical object in a physical space, the physical space being referenced by a first coordinate system, said method comprising steps of:

defining a first point on said first physical object;

determining a first location of said first point by taking at least two measurements of said first point in relation to the first coordinate system;

defining a second point on said second physical object;

combining said first physical object and said second physical object;

determining a second location of said second point by taking at least two measurements of said second point in relation to the first coordinate system, after performing said combining;

generating a linear mean value and a directional mean value for said first location and said second location by performing statistical analysis in a second coordinate system, having a linear coordinate and at least one directional coordinate; and adjusting the position of said second location with respect to said first location using said linear mean value and said directional mean value, thereby combining the first physical object and the second physical object.

10. The method of claim 9 further including the step of combining a third physical entity and a fourth physical entity into said first coordinate system using said linear mean and said directional mean value.

11. The method of claim 9 wherein the step of adjusting the position further comprises combining said second point on said second entity to connect with said first point on said first entity.

12. The method of claim 9 wherein said first location and said second location having coordinate values taken with respect to said first coordinate system.

13. The method of claim 9 further comprising the step of transforming said measurements into vector data, before performing statistical analysis.

14. The method of claim 9 further comprising the step of converting linear mean value and directional mean value into mean coordinate values in said first coordinate system, before analyzing said second location with respect to said first location.

15. The method of claim 9 wherein said first coordinate system is a Cartesian coordinate system.

16. The method of claim 9 wherein said second coordinate system is at least one of a Polar coordinate system and a Spherical coordinate system.

17. The method of claim 9 wherein said first locating point is defined at a centroid point of a contact surface of said first object and said second locating point is defined at a centroid point of a contact surface of said second object.

18. A method for color matching a first color and a second color, said method comprising steps of:

defining a first point in a first coordinate system, wherein said first point is indicative of a first color;

determining a first location of said first point in said first coordinate system;

defining a second point by mixing colors, wherein said second point is indicative of a second color;

determining a second location of said second point in said first coordinate system;

generating a linear mean value and a directional mean value by performing statistical analysis in a second coordinate system, having a linear coordinate and at least one directional coordinate, to said first location and said second location; and analyzing said first location with respect to said second location using said linear mean value and said directional mean value.

19. The method of claim 18 further including the step of:

adjusting said color mixing for defining a third point, wherein said third point is indicative of a third color in said first coordinate system, using said linear mean and said directional mean value.

20. The method of claim 18 wherein said first coordinate system includes an L coordinate, an a coordinate and a b coordinate in a CIE color space system.

* * * * *